United States Patent
Uematsu et al.

(10) Patent No.: US 10,700,327 B2
(45) Date of Patent: Jun. 30, 2020

(54) SECONDARY BATTERY

(71) Applicant: Kabushiki Kaisha Toshiba, Minato-ku (JP)

(72) Inventors: Ikuo Uematsu, Yokohama (JP); Naoya Hayamizu, Yokohama (JP); Naoaki Sakurai, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 16/152,504

(22) Filed: Oct. 5, 2018

(65) Prior Publication Data

US 2019/0036095 A1 Jan. 31, 2019

Related U.S. Application Data

(63) Continuation of application No. 14/604,559, filed on Jan. 23, 2015, now Pat. No. 10,135,050, which is a
(Continued)

(30) Foreign Application Priority Data

Jul. 24, 2012 (JP) .................. 2012-164164

(51) Int. Cl.
*H01M 2/16* (2006.01)
*H01M 4/485* (2010.01)
*H01M 10/0525* (2010.01)

(52) U.S. Cl.
CPC ......... *H01M 2/162* (2013.01); *H01M 2/1673* (2013.01); *H01M 4/485* (2013.01); *H01M 10/0525* (2013.01)

(58) Field of Classification Search
CPC .... H01M 2/162; H01M 2/1673; H01M 4/485; H01M 10/0525
See application file for complete search history.

(56) References Cited

U.S. PATENT DOCUMENTS 5,686,203 A    11/1997    Idota
6,827,921 B1 *   12/2004    Singhal .................. B82Y 30/00
                                                               423/179.5
(Continued)

FOREIGN PATENT DOCUMENTS

CN         101475663 A      7/2009
DE       102010032770       2/2001
(Continued)

OTHER PUBLICATIONS

International Search Report dated Oct. 22, 2013 for PCT/JP2013/070120 Filed on Jul. 24, 2013 (English Language).
(Continued)

*Primary Examiner* — Jimmy Vo
(74) *Attorney, Agent, or Firm* — Oblon, McClelland, Maier & Neustadt, L.L.P.

(57) ABSTRACT

According to one embodiment, the secondary battery includes a container, an electrode structure provided in the container and an electrolyte provided in the container. The electrode structure includes a positive electrode, a negative electrode, and a separator provided between the positive electrode and the negative electrode. The separator includes an organic fiber layer accumulated on at least one of the positive electrode and the negative electrode. The organic fiber layer has contacts in which the organic fiber intersects with itself. The form of the intersections is changed by a tensile stress.

8 Claims, 24 Drawing Sheets

Related U.S. Application Data continuation of application No. PCT/JP2013/070120, filed on Jul. 24, 2013.

(56) References Cited

U.S. PATENT DOCUMENTS

| | | | |
|---|---|---|---|
| 7,279,251 | B1 | 10/2007 | Yun et al. |
| 8,192,859 | B2 | 6/2012 | Takami et al. |
| 8,263,264 | B2 | 9/2012 | Fujita et al. |
| 2005/0069777 | A1 | 3/2005 | Takami et al. |
| 2005/0208383 | A1 | 9/2005 | Totsuka |
| 2007/0059592 | A1 | 3/2007 | Takami |
| 2009/0261035 | A1 | 10/2009 | Arora et al. |
| 2010/0124701 | A1 | 5/2010 | Naoi et al. |
| 2010/0216027 | A1 | 8/2010 | Fujii |
| 2010/0304205 | A1 | 12/2010 | Jo et al. |
| 2011/0217585 | A1* | 9/2011 | Wang ............... B32B 37/02 429/145 |
| 2012/0028091 | A1 | 2/2012 | Park |
| 2012/0082884 | A1 | 4/2012 | Orilall et al. |
| 2013/0236766 | A1* | 9/2013 | Seo .................. H01M 2/145 429/144 |

FOREIGN PATENT DOCUMENTS

| | | |
|---|---|---|
| DE | 10 2010 032 770 A1 | 2/2012 |
| JP | 50-154742 A | 12/1975 |
| JP | 11-167934 A | 6/1999 |
| JP | 2001-143702 A | 5/2001 |
| JP | 3253632 B2 | 11/2001 |
| JP | 2002-249966 A | 9/2002 |
| JP | 2003-109654 | 4/2003 |
| JP | 2006-92829 A | 4/2006 |
| JP | 2006-331791 A | 12/2006 |
| JP | 2007-103352 A | 4/2007 |
| JP | 2009-283315 A | 12/2009 |
| JP | 4421570 B2 | 12/2009 |
| JP | 2010-500718 A | 1/2010 |
| JP | 4445537 B2 | 1/2010 |
| JP | 2010-504444 A | 2/2010 |
| JP | 2010-50718 | 3/2010 |
| JP | 2010-123381 A | 6/2010 |
| JP | 2010-135342 A | 6/2010 |
| JP | 2010-170979 A | 8/2010 |
| JP | 2010-182922 A | 8/2010 |
| JP | 2010-192860 A | 9/2010 |
| JP | 2010-225809 A | 10/2010 |
| JP | 2011-207149 A | 10/2011 |
| JP | 2011-243344 | 12/2011 |
| JP | 2012-033312 | 2/2012 |
| JP | 2012-033314 | 2/2012 |
| JP | 2012-64366 A | 3/2012 |
| JP | 2012-132121 A | 7/2012 |
| WO | WO 2010/027063 A1 | 3/2010 |
| WO | WO 2010/098796 | 9/2010 |
| WO | WO-2012060604 A2 * | 5/2012 ............ H01M 2/145 |

OTHER PUBLICATIONS

International Written Opinion dated Oct. 22, 2013 for PCT/JP2013/070120 Filed on Jul. 24, 2013.

Office Action dated Mar. 10, 2015 in Japanese Patent Application No. 2014-102839 (w/English language translation).

Notification for Filing Opinion dated Jun. 12, 2015 in Korean Patent Application No. 10-2015-7004426 (w/English language translation).

Combined Chinese Office Action and Search Report dated Sep. 6, 2015 in Chinese Patent Application No. 201380039207.3 (w/English translation).

Extended European Search Report dated Apr. 25, 2016 in Patent Application No. 13822874.7.

* cited by examiner

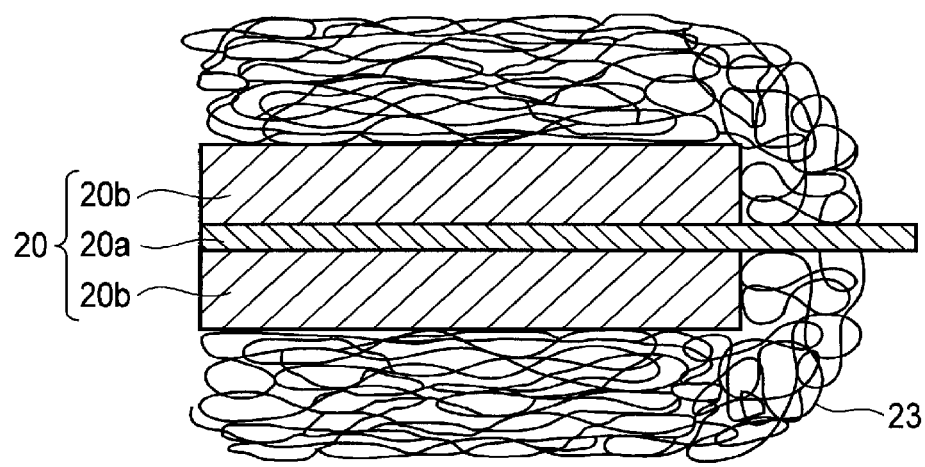
F I G. 3A
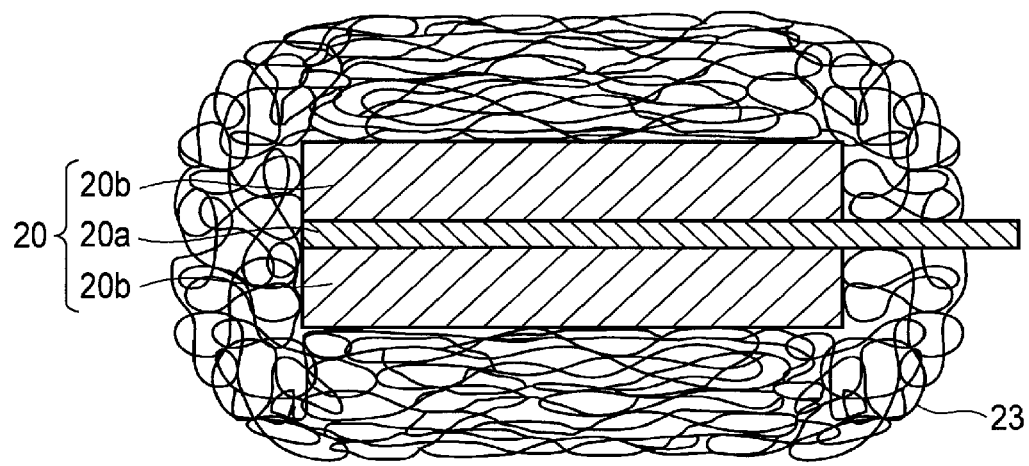
F I G. 3B

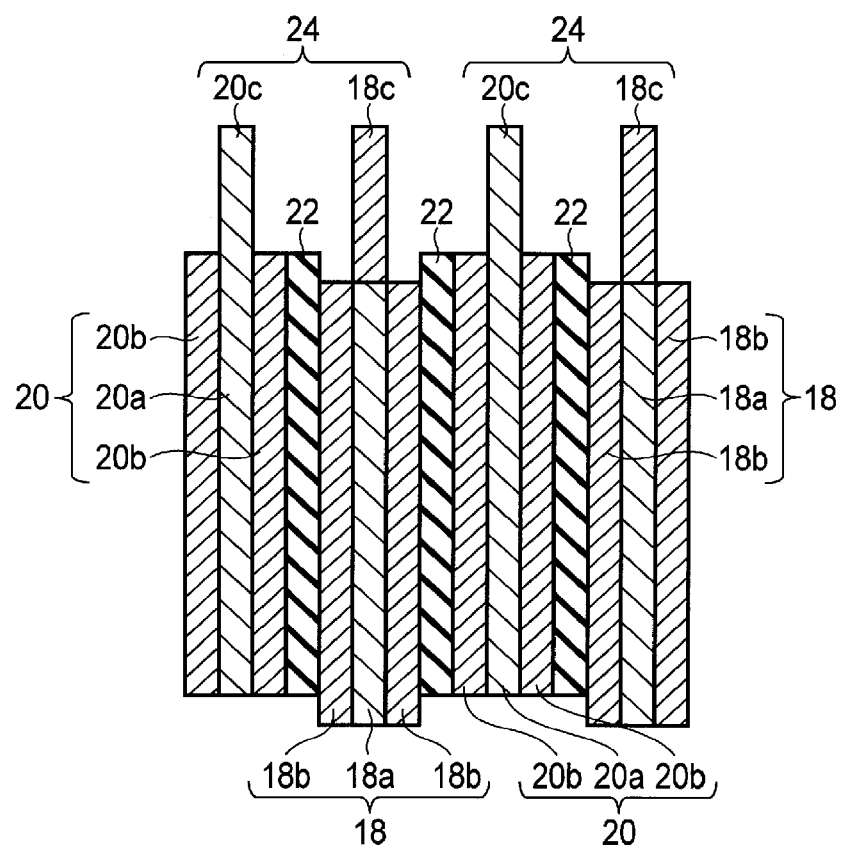
F I G. 7

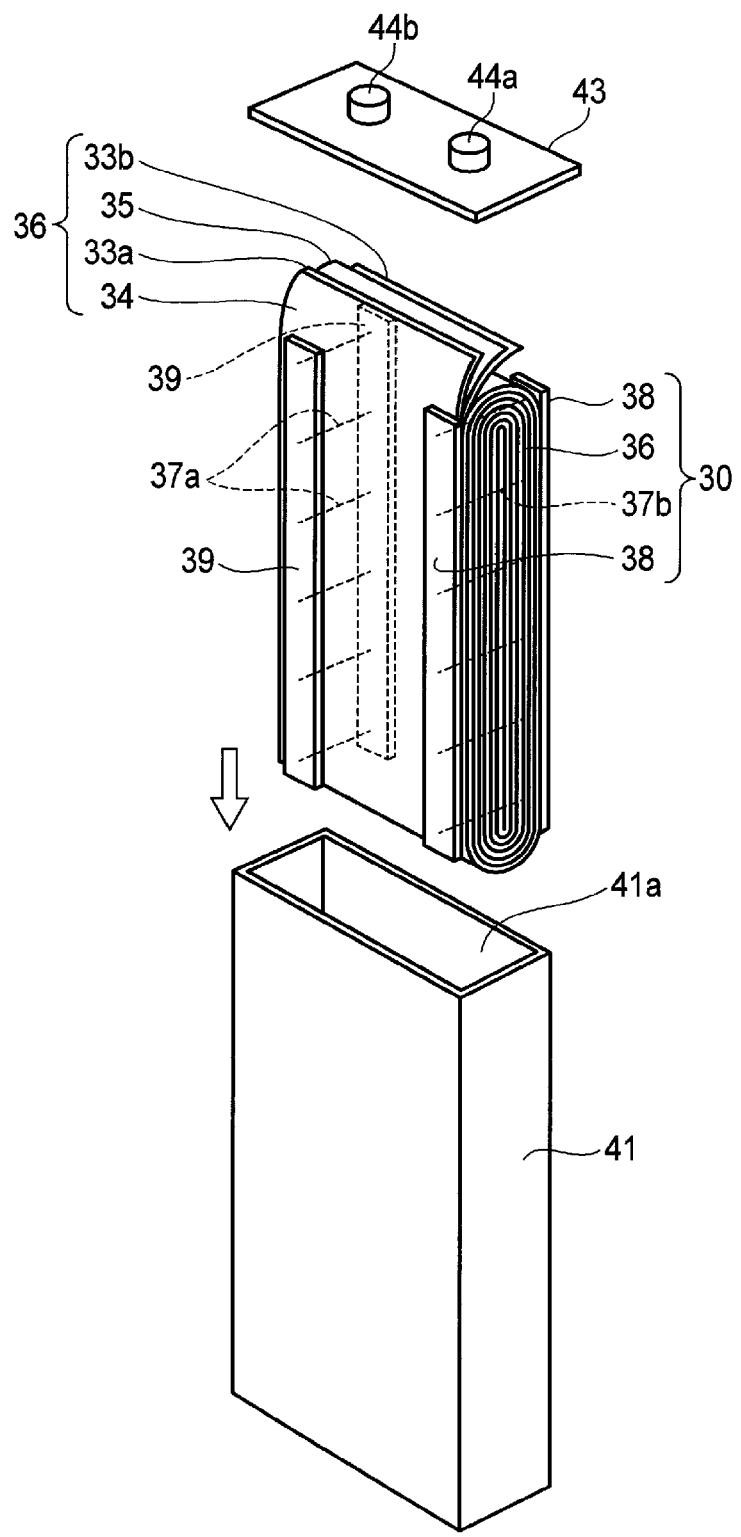
F I G. 10

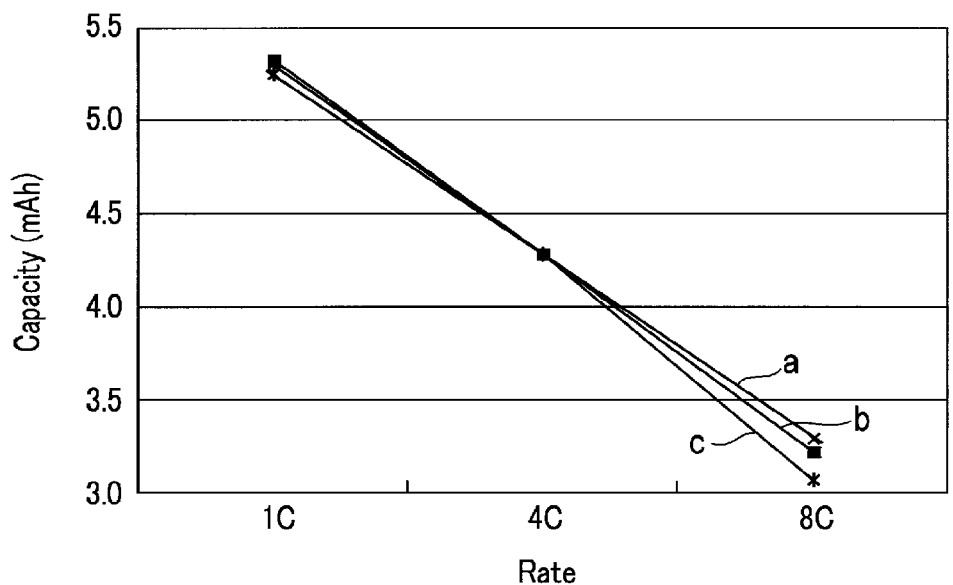
F I G. 12
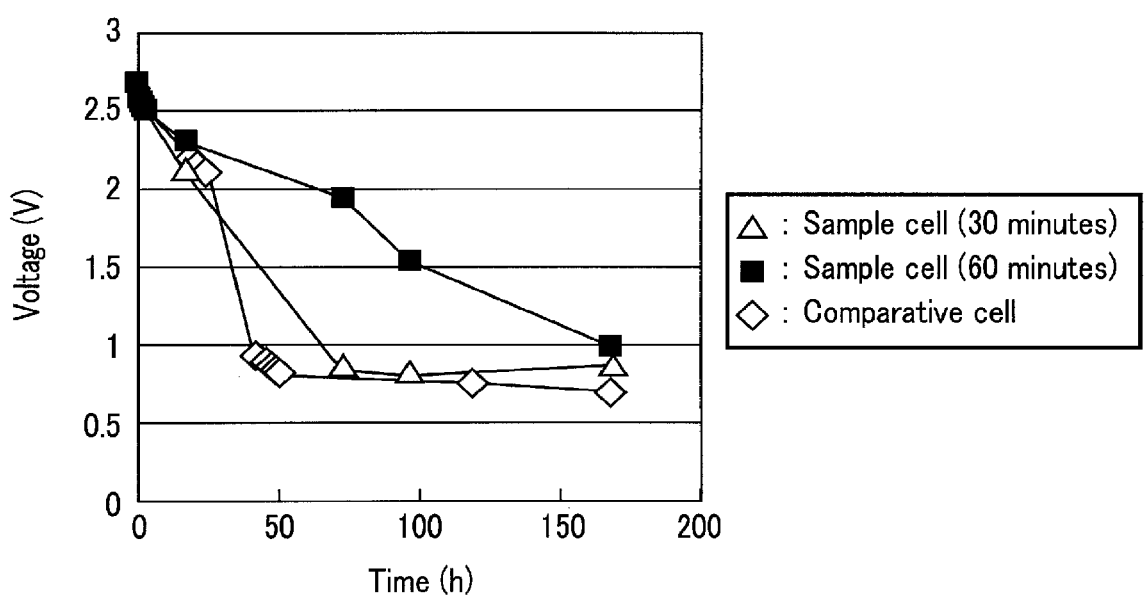
F I G. 13

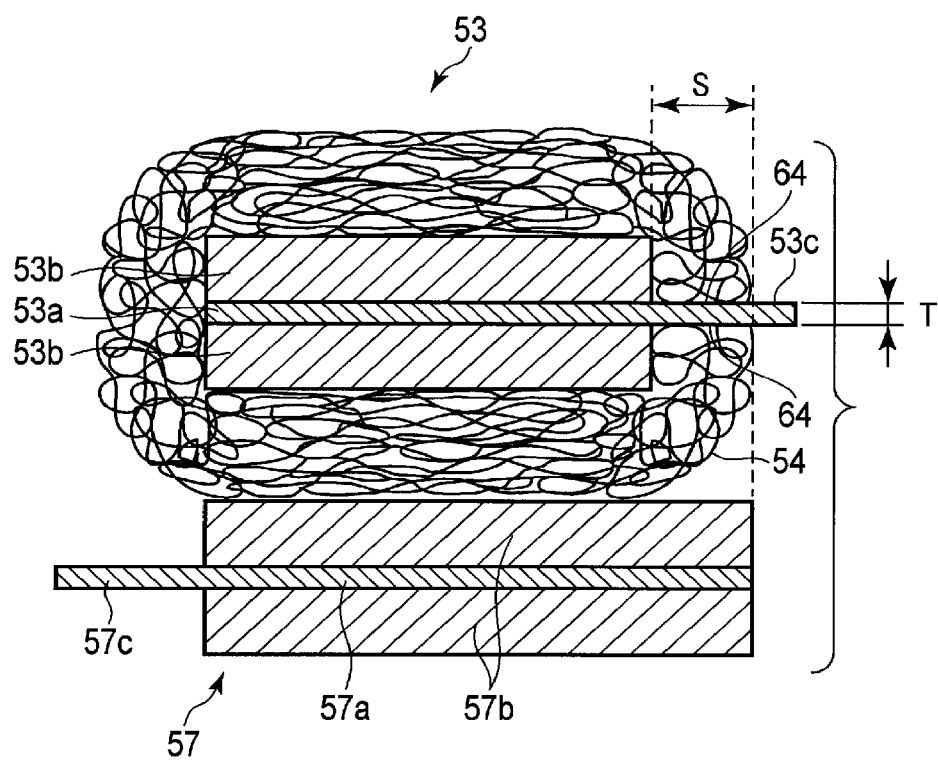
F I G. 18

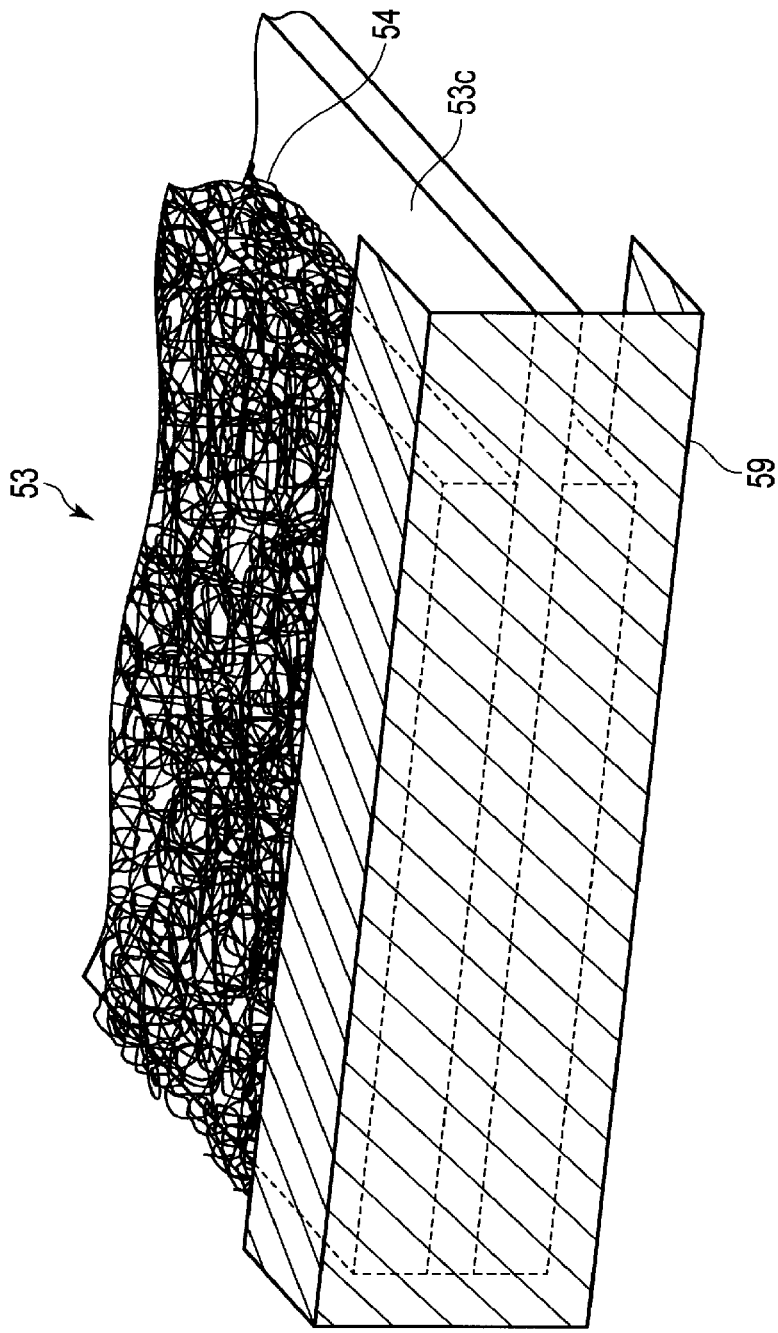
F I G. 19

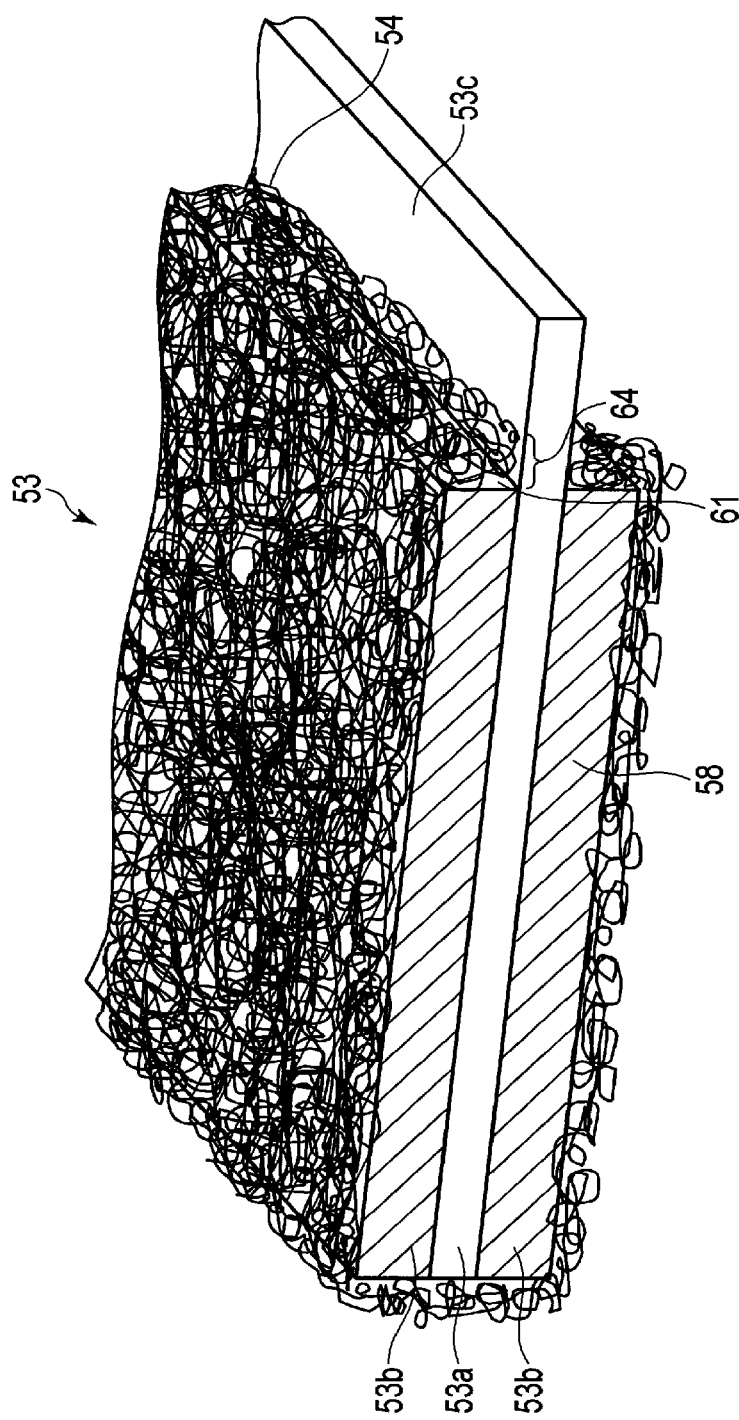
F I G. 20

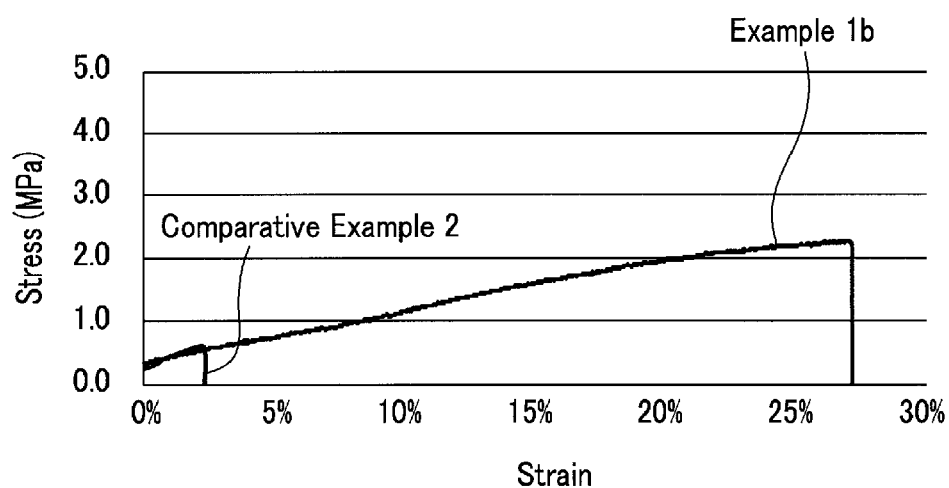
F I G. 22

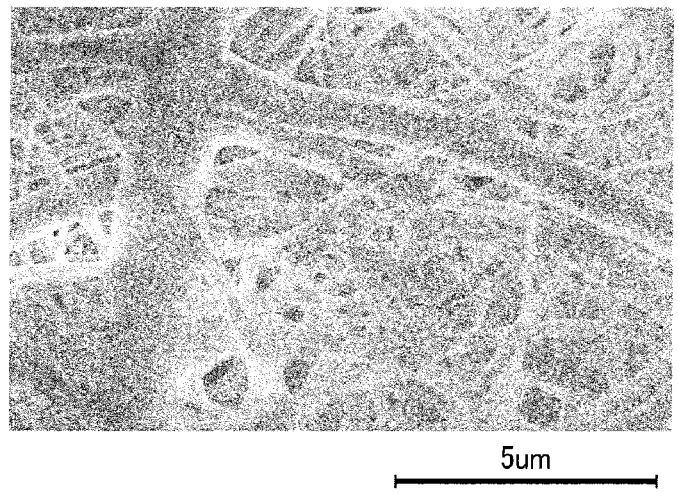
F I G. 25
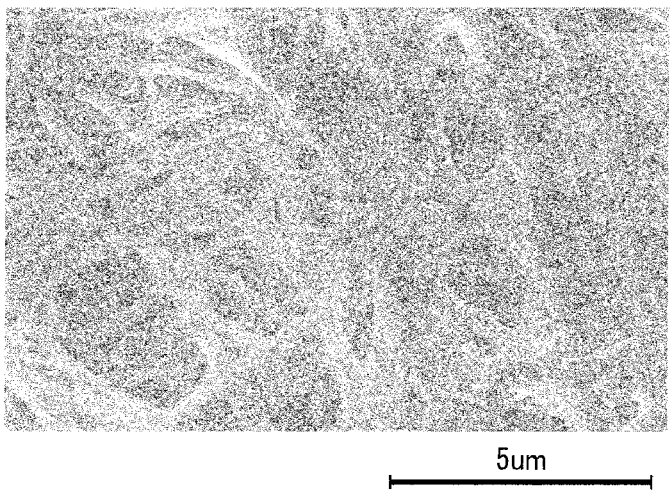
F I G. 26

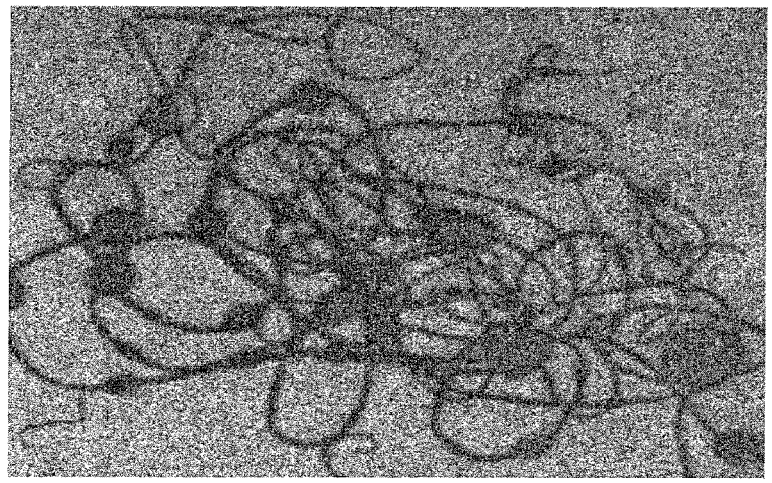
F I G. 29
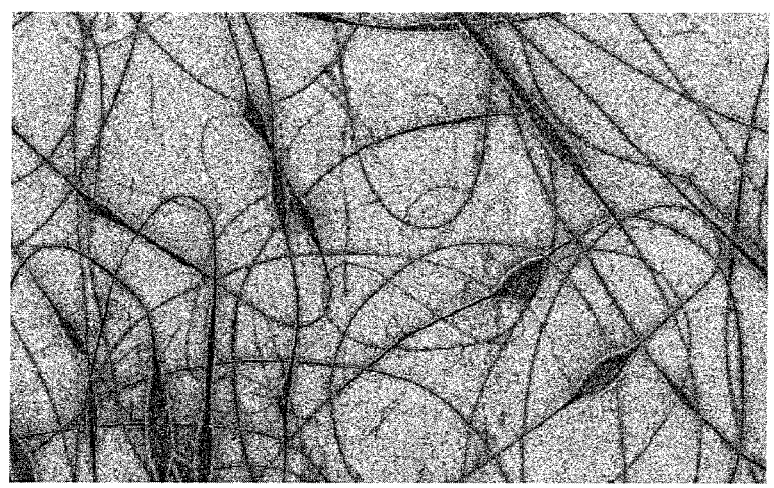
F I G. 30

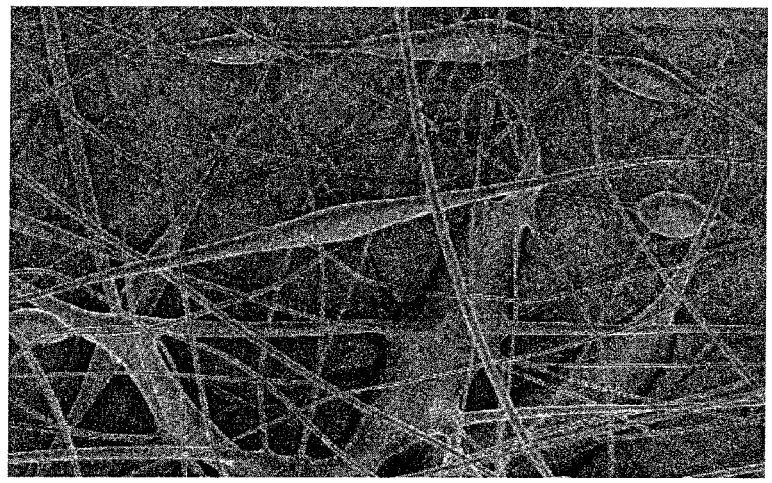
F I G. 31
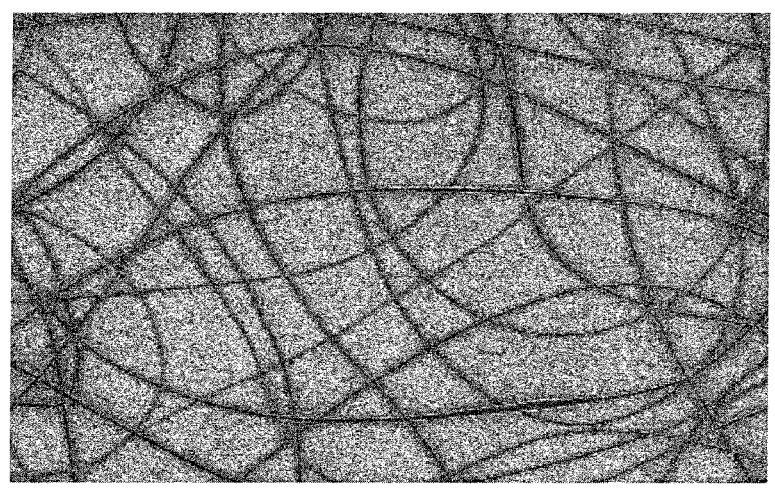
F I G. 32

US 10,700,327 B2

SECONDARY BATTERY

CROSS REFERENCE TO RELATED APPLICATIONS

This application is a continuation of and claims the benefit of priority under 35 U.S.C. § 120 from U.S. application Ser. No. 14/604,559 filed Jan. 23, 2015, which is a continuation of PCT Application No. PCT/JP2013/070120 filed Jul. 24, 2013, and claims the benefit of priority under 35 U.S.C. § 119 from Japanese Patent Application No. 2012-164164 filed Jul. 24, 2012, the entire contents of each of which are incorporated herein by reference.

FIELD

Embodiments of the present invention relate to a secondary battery.

BACKGROUND

In secondary batteries such as lithium secondary batteries, porous separators are used to avoid contact between a positive electrode and a negative electrode. The separator is usually prepared as a self-supporting film which is distinct from the positive electrode and the negative electrode. The separator is sandwiched by the positive electrode and the negative electrode to form a unit structure (electrode cell), and the resulting electrode cell is wound or the cells are stacked, thereby obtaining a battery.

The separator generally used includes a fine porous film of a polyolefin resin film. Such a separator is produced, for example, by extrusion-molding a molten material including a polyolefin resin composition into a sheet, extracting and removing substances other than the polyolefin resin, and drawing the resulting sheet.

The resin film separator is required to have sufficient mechanical strength to resist breakage during battery production, and thus it is difficult to reduce the film thickness by much. Regarding batteries, in particular a type in which a large number of battery cells are stacked or the battery cell is wound, accordingly, the number of the unit cell layers which can be used, per unit volume of the battery is restricted by the thickness of the separator. This leads to a decrease in a battery capacity. In addition, the resin film separator is poor in durability, and when it is used for a secondary battery, a disadvantage occurs in which the separator deteriorates in repeated charging and discharging, thus resulting in a decrease of the cycle characteristics of the battery.

BRIEF DESCRIPTION OF DRAWINGS

FIGS. 3A and 3B are outline views showing other examples of a negative electrode and an organic fiber layer fixed and supported thereon.

FIG. 7 is a cross-sectional view showing one example of an electrode structure.

FIG. 10 is an exploded perspective view showing a wound type secondary battery.

FIG. 12 is a chart showing initial charging characteristics.

FIG. 13 is a chart showing self-discharge characteristics.

FIG. 18 is a cross-sectional view showing a relationship between the electrode integrated with the organic fiber layer shown in FIG. 15 or FIG. 16, and a counter electrode.

FIG. 19 is a perspective view showing a state in which an end surface of the electrode integrated with the organic fiber layer, shown in FIG. 15, is covered with an insulating tape.

FIG. 20 is a perspective view showing a state before an insulating tape is stuck to the electrode integrated with the organic fiber layer shown in FIG. 19.

FIG. 22 is a chart showing a relationship between a tensile stress and a strain amount concerning a separator from Example 1b or Comparative Example 2.

FIG. 25 is an SEM photograph of a surface of the separator from Comparative Example 2.

FIG. 26 is an SEM photograph of a surface of the separator from Comparative Example 2.

FIG. 29 is an SEM photograph showing a surface of a separator from Reference Example 1.

FIG. 30 is an SEM photograph showing a surface of a separator from Reference Example 2.

FIG. 31 is an SEM photograph showing a surface of a separator from Reference Example 3.

FIG. 32 is an SEM photograph showing a surface of a separator from Example 3.

DETAILED DESCRIPTION

Figure 1:
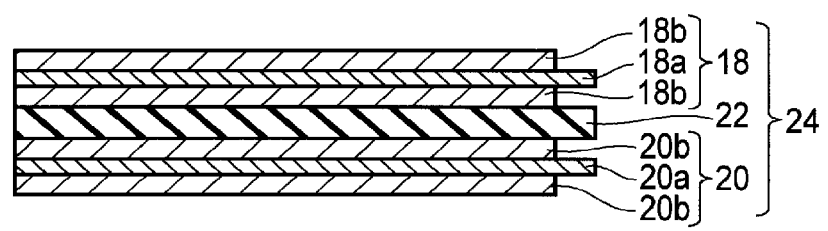
FIG. 1 is a cross-sectional view showing a battery cell in an electrode structure included in a secondary battery according to one embodiment.

The problem to be solved by the present invention is to provide a secondary battery in which a decrease of the battery capacity thereof is reduced.

According to the embodiments, the secondary battery includes a container, an electrode structure provided in the container, and an electrolyte. The electrode structure includes a positive electrode and a negative electrode, between which an insulator is provided. The insulator includes an organic fiber layer, which is fixed and supported on at least one of the positive electrode and the negative electrode.

According to the embodiments, the secondary battery includes a separator and an electrode as at least one electrode of a positive electrode and a negative electrode. The electrode includes a current collector having an outer edge, a tab protruding from the outer edge of the current collector and integrally formed with the current collector, and an active material-containing layer supported on at least one side of the current collector. The separator includes an organic fiber layer. The organic fiber layer is accumulated on the active material-containing layer and on an intersection part of an end surface of the active material-containing layer and a surface perpendicular to a thickness direction of the tab.

According to the embodiments, the secondary battery includes a container, an electrode structure provided in the container and an electrolyte provided in the container. The electrode structure includes a positive electrode, a negative electrode, and a separator provided between the positive electrode and the negative electrode. The separator includes an organic fiber layer accumulated on at least one of the positive electrode and the negative electrode. The organic fiber layer has contacts in which the organic fiber intersects with itself. The form of the intersections is changed by a tensile stress.

The embodiments of the present invention are explained below, referring to the drawings below.

Figure 2:
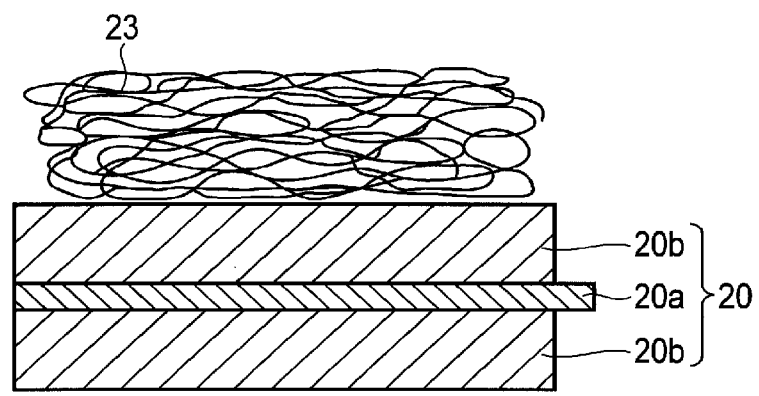
FIG. 2 is an outline view showing one example of a negative electrode and an organic fiber layer fixed and supported thereon.

FIG. 1 is a cross-sectional view showing one example of a battery cell in an electrode structure included in a secondary battery according to one embodiment. The battery cell 24 illustrated includes a positive electrode 18, a negative electrode 20 and an insulator 22 provided between the positive electrode 18 and the negative electrode 20, and the insulator 22 includes an organic fiber layer. As shown in FIG. 2, the organic fiber layer 23 is not a self-supporting film, but is supported on the negative electrode 20 and fixed on the negative electrode 20. The combination of the negative electrode 20 and the organic fiber layer 23, as shown in FIG. 2, may be referred to as an organic fiber layer-covered electrode. The organic fiber layer 23 in the present embodiment is formed directly by supplying a starting material onto the negative electrode 20, which will be explained in detail later.

As illustrated, the negative electrode 20 is formed by providing a negative electrode active material layer (negative electrode active material-containing layer) 20b on a surface of a negative electrode current collector 20a, and the positive electrode 18 is formed by providing a positive electrode active material layer (positive electrode active material-containing layer) 18b on a surface of a positive electrode current collector 18a. A metal foil, such as aluminum foil, is used as the negative electrode current collector 20a and the positive electrode current collector 18a. The negative electrode active material layer is formed using a slurry including a negative electrode active material, a negative electrode conductive agent and a binder, and the positive electrode active material layer is formed using a slurry including a positive electrode active material, a positive electrode conductive agent and a binder.

It is possible, as the negative electrode active material, to use carbon materials including graphite, tin-silicon alloy materials, and the like, but it is preferable to use lithium titanate. The lithium titanate may include, for example, $Li_{4+x}Ti_5O_{12}$ ($0 \leq x \leq 3$) having a spinel structure, and $Li_{2+y}Ti_3O_7$ ($0 \leq y \leq 3$) having a ramsdellite structure. It is preferable for primary particles of the negative electrode active material to have an average particle size within a range of 0.001 to 1 μm. The particle form may be any of particulate and fibrous. When the particles are fibrous, the fiber diameter thereof is preferably 0.1 μm or less.

When lithium titanate having a small particle size such as an average particle size of 1 μm or less is used as the negative electrode active material, a negative electrode active material layer having a high surface flatness can be obtained. In addition, when the lithium titanate having a small particle size is used, the resulting battery has a potential lower than that of a typical lithium secondary battery, and thus lithium metal is not deposited in principle.

The negative electrode conductive agent may include, for example, acetylene black, carbon black, graphite, and the like. The binder, used for binding the negative electrode active material to the negative electrode conductive agent, may include, for example, polytetrafluoroethylene (PTFE), polyvinylidene fluoride (PVdF), fluororubber, styrene-butadiene rubber, and the like.

Typical lithium-transition metal composite oxides may be used as the positive electrode active material. Examples thereof may include $LiCoO_2$, $LiNi_{1-x}Co_xO_2$ ($0<x<0.3$), $LiMn_xNi_yCo_zO_2$ ($0<x<0.5$, $0<y<0.5$, and $0<z<0.5$), $LiMn_{2-x}M_xO_4$(M is Li, Mg, Co, Al, or Ni, and $0<x<0.2$), $LiMPO_4$ (M is Fe, Co, or Ni), and the like.

The positive electrode conductive agent may include, for example, carbonaceous materials such as acetylene black, carbon black, or graphite. The binder may include, for example, polytetrafluoroethylene (PTFE), polyvinylidene fluoride (PVdF), fluororubber, and the like.

The organic fiber layer 23 acts as a separator through which electrons do not pass but lithium ions pass.

The organic fiber layer 23 may be continuously formed over the other side of the negative electrode 20 as shown in FIG. 3A, or may further cover edges of the negative electrode 20 as shown in FIG. 3B. The positive electrode 18 can be used instead of the negative electrode 20 for fixing and supporting the organic fiber layer 23.

Figure 4A:
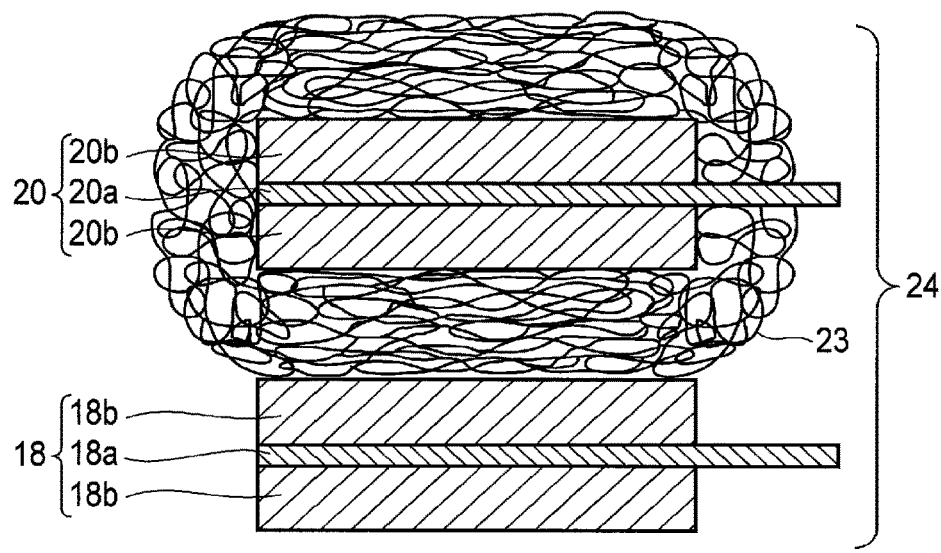
FIGS. 4A to 4C are outline views showing other examples of a battery cell.
Figure 4B:
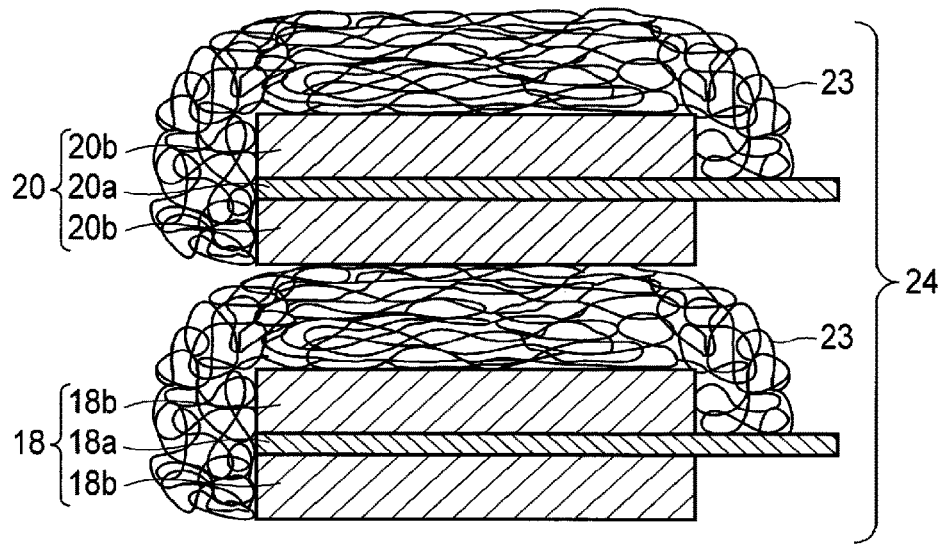
Figure 4C:
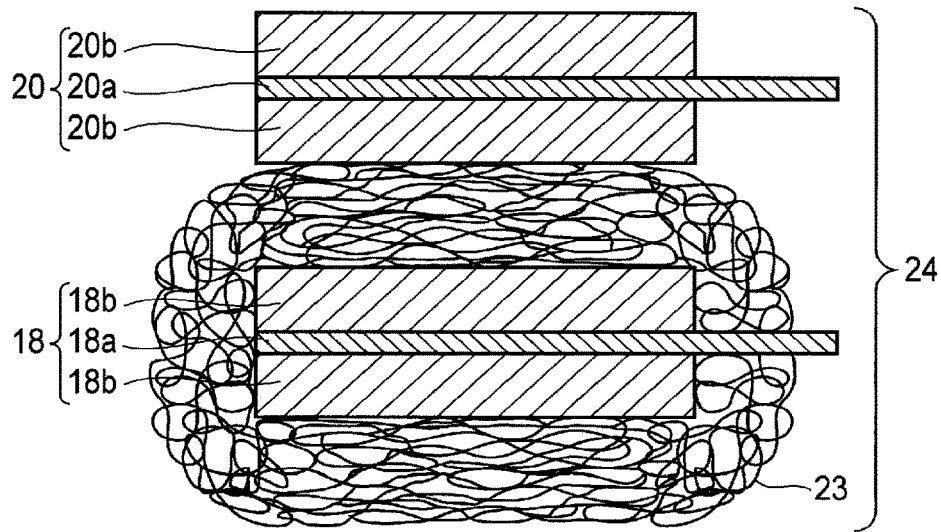

FIG. 4A to 4C show other examples of the electrode cell 24. In an electrode cell 24 shown in FIG. 4A, an organic fiber layer 23 covers edges in addition to both sides of a negative electrode 20. In an electrode cell 24 shown in FIG. 4B, an organic fiber layer 23 covers one side of a negative electrode 20 and edges thereof, and one side of a positive electrode 18 and edges thereof. In an electrode cell 24 shown in FIG. 4C, an organic fiber layer 23 covers both sides of a positive electrode 18 and edges thereof. Such formations can inhibit misalignment between the electrode surfaces facing each other, and short-circuits caused by chips of the electrode and the current collector. Moreover, short-circuits can be avoided at the edges, and the safety of the battery can be increased, because of the structure in which the edges of the electrode are covered with the insulator including the organic fiber layer 23. The covering of the edges of the electrode with the insulator including the organic fiber layer 23 also leads to improved self-discharge characteristics.

In the present embodiment, the organic fiber layer 23 can be directly formed on the surface of the negative electrode or the positive electrode from a solution including an organic material as a starting material by using, for example, an electrospinning method, an ink jet method, a jet dispenser method, a spray coating method, or the like. It is generally said that, in order to form a separator from a self-supporting film, a thickness of the film should be 12 µm or more. In the present embodiment, the organic fiber layer 23 having a thickness of less than 12 µm is obtained because the layer is directly formed by supplying the starting material on the electrode. The thickness of the insulator 22 between the positive electrode 18 and the negative electrode 20 can be reduced, thus resulting in a reduction in the thickness of the electrode cell 24.

As described above, when the lithium titanate having a small particle size such as an average particle size of 1 µm or less is used as the negative electrode active material, a negative electrode active material layer having excellent surface flatness can be obtained. An organic fiber layer having a uniform thickness can be formed on the negative electrode active material layer having such high flatness. Moreover, when lithium titanate having small particles is used, the lithium ions are not deposited in principle, and thus it is not required to consider the penetration of the lithium ions through the insulator on the negative electrode active material layer when the thickness of the insulation is decided. It is possible, accordingly, to reduce the thickness of the insulator.

The organic fiber preferably has a length of 1 mm or more and a diameter of 1 µm or less. The organic fiber layer as described above has sufficient strength, porosity, air permeability, pore size, electrolytic solution resistance, oxidation-reduction resistance, and the like, and thus it functions favorably as the separator. The diameter of the organic fiber can be measured by electron microscope (SEM) observation, a scanning probe microscope (SPM), TEM, STEM, or the like. The length of the organic fiber can be obtained based on a length measurement in the SEM observation.

It is preferable that 30% or more of the entire volume of the fibers forming the organic fiber layer 23 is accounted for by organic fibers having a diameter of 1 µm or less, because it is necessary to ensure the ion permeability and a capability of impregnation with an electrolytic solution. The diameter is preferably within a range of 350 nm or less, more preferably a range of 50 nm or less. It is also preferable that a volume of organic fibers having a diameter of 1 µm or less (more preferably 350 nm or less, still more preferably 50 nm or less) is 80% or more of the entire volume of the fibers forming the organic fiber layer 23. The state described above can be confirmed by the SEM observation of the organic fiber layer 23. It is more preferable that 40% or more of the entire volume of the fibers forming the organic fiber layer 23 is accounted for by organic fibers having a diameter of 40 nm or less. When the diameter of the organic fiber is small, this means that the effects of interference with the movement of lithium ions are reduced.

The organic fiber layer 23 in the present embodiment has pores, and the pores have preferably an average pore size of 5 nm to 10 µm. The porosity thereof is preferably from 10 to 90%. When the layer has such pores, a separator having excellent lithium ion permeability and good electrolyte impregnating property can be obtained. The porosity is more preferably 80% or more. The average pore size and the porosity of the pores can be confirmed by the mercury penetration method, volume and density calculation, SEM observation, or gas adsorption-desorption method. When the porosity of the organic fiber layer 23 is large, this means that effects of interference with the movement of lithium ions are reduced.

When an electrospinning method is used, the organic fiber layer 23 having the characteristics described above can be easily formed on the surface of the negative electrode 20 or the positive electrode 18. According to the electrospinning method, one continuous fiber is formed in principle, and thus resistance against breakage caused by bending and cracking of the film can be secured, even if the film is thin. When the layer is formed of one organic fiber, the probability of the occurrence of frayed organic fiber layer or partially missing parts on the organic fiber layer becomes low, and thus such a layer is advantageous in terms of the inhibition of self-discharge.

In the electrospinning, a solution prepared by dissolving an organic material in a solvent is used. The organic material can be selected from the group consisting of, for example, polyamide-imide, polyamide, polyolefin, polyether, polyimide, polyketone, polysulfone, cellulose, polyvinyl alcohol (PVA) and polyvinylidene fluoride (PVdF). The polyolefin may include, for example, polypropylen, (PP), polyethylene (PE), and the like. The polyimide and PVdF are considered to generally be difficult to form into fibers. When the electrospinning method is employed, such materials can be formed into fibers, from which a layer can be formed.

In particular, polyimide does not dissolve, melt, or decompose even at 250 to 400° C., and thus an organic fiber layer having a high heat resistance can be obtained therefrom.

The organic material as described above is used by dissolving it in a solvent at a concentration of, for example, about 5 to 60% by mass. The solvent dissolving the organic material is not particularly limited, and any solvent such as dimethylacetoamide (DMAc), dimethylsulfoxide (DMSO), N,N'-dimethylformamide (DMF), N-methylpyrrolidone (NMP), water, or alcohols can be used. When an organic material having a low solubility is used, the electrospinning is performed while an organic material sheet is molten by using a laser, or the like. In addition, it is acceptable to mix an organic solvent having a high boiling point and an organic solvent having a low boiling point.

The organic fiber layer is formed by discharging the starting material solution from a spinning nozzle over the surface of a pre-determined electrode, while a voltage is applied to the spinning nozzle using a high voltage generator. The applied voltage may be appropriately decided depending on the kind of the solvent and the solute, the boiling point and the vapor pressure curve of the solvent, the concentration of the solution, the temperature, the shape of the nozzle, the distance between the sample and the nozzle, and the like, and, for example, a potential between the nozzle and the workpiece can be from 0.1 to 100 kV. The speed of supply of the starting material solution may also be appropriately decided depending on the solution concentration, the solution viscosity, the temperature, the pressure, the applied voltage, the nozzle shape, and the like. When a syringe type is used, the speed can be, for example, about 0.1 to 500 μl/minute per nozzle. When multiple nozzles or a slit nozzle is used, the supply speed may be decided depending on the opening area.

The entering of the solvent into the inside of the electrode can be substantially avoided, because the organic fiber is directly formed on the surface of the electrode in a dry state. The amount of the solvent remaining inside the electrode is as extremely low as the ppm level or lower. Any solvent remaining inside the electrode causes a battery loss by an oxidation-reduction reaction, which leads to reduced battery performance. According to the present embodiment, the possibility of causing such defects can be minimized, thus resulting in enhanced battery performance.

In the organic fiber layer, the porosity can be increased if the organic fiber included is in a non-dense state, and thus it is not difficult to obtain a layer having a porosity of, for example, about 90%. It is very difficult to obtain a layer having such large porosity as described above if particles are used.

A layer formed of inorganic particles is very disadvantageous in terms of unevenness, ease of breakage, capability of impregnation with an electrolytic solution, adherence, bending property, porosity, and ion permeability. It is clear that the organic fiber layer in the present embodiment is more advantageous in the unevenness, ease of breakage, capability of impregnation with an electrolytic solution, adherence, bending property, porosity, and ion permeability than an inorganic fiber layer.

It is preferable that there are cation exchange groups on the surface of the organic fiber. The movement of the lithium ions through the separator can be promoted by cation exchange groups, thus resulting in enhanced battery performance. Specifically, it is possible to perform rapid charging or rapid discharging over a long period of time. The cation exchange group is not particularly limited, and may include, for example, a sulfonic acid group and a carboxylic acid group. A fiber having a cation exchange group on its surface can be formed, for example, by the electrospinning method using a sulfonated organic material.

Figure 5:
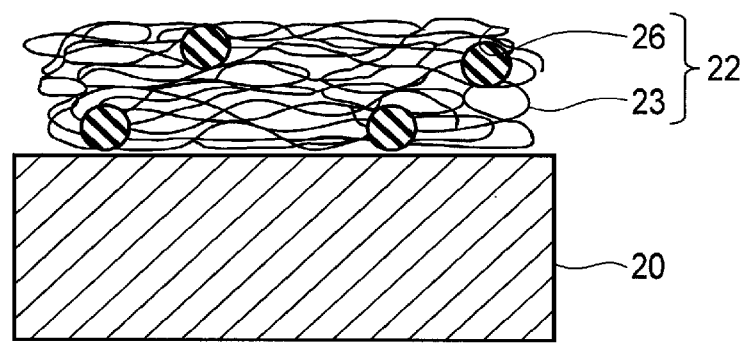
FIG. 5 is an outline view showing another example of a negative electrode and an organic fiber layer fixed and supported thereon.

As shown in FIG. 5, the insulator 22 may further include an inorganic component 26 in addition to the organic fiber layer 23. When the inorganic component 26 is included, the strength of the insulator 22 including the organic fiber layer can be increased. As the inorganic component 26, for example, oxides and nitrides can be used.

The oxide may include, for example, $Li_2O$, $BeO$, $B_2O_3$, $Na_2O$, $MgO$, $Al_2O_3$, $SiO_2$, $P_2O_5$, $CaO$, $Cr_2O_3$, $Fe_2O_3$, $ZnO$, $ZrO_2$, $TiO_2$, and the like, zeolite ($M_{2/n}O.Al_2O_3.xSiO_2.yH_2O$ wherein M is a metal atom such as Na, K, Ca or Ba, n is a number corresponding to an electrical charge of a metal cation $M^{n+}$, and x and y are molar numbers of $SiO_2$ and $H_2O$, respectively, and $2 \leq x \leq 10$ and $2 \leq y$), and the like. The nitride may include, for example, BN, AlN, $Si_3N_4$, $Ba_3N_2$, and the like.

It is further possible to use, as the inorganic component, silicon carbide (SiC), zircon ($ZrSiO_4$), carbonates (such as $MgCO_3$ and $CaCO_3$), sulfates (such as $CaSO_4$ and $BaSO_4$), composites thereof (such as steatite ($MgO.SiO_2$), forsterite ($2MgO.SiO_2$) and cordierite ($2MgO.2Al_2O_3.5SiO_2$) which are kinds of porcelain), and the like.

The shape of the inorganic component is not particularly limited, and may be any shape such as a sphere, scale, polygon, or fiber.

In general, it is preferable to use an inorganic component having a high hardness. When excessive pressure is applied to the organic fiber layer, the pores in the layer may be deformed and collapsed. When the inorganic component is present with the organic fiber layer, the deformation of the pores can be avoided by the inorganic component. The impregnating property of the electrolyte and the ion conductivity are not reduced, and the degradation of the durability of the battery can be avoided.

With respect to the particle size of the inorganic component, the average particle size is preferably from 5 nm to 100 μm, more preferably from 5 nm to 10 μm, still more preferably from 5 nm to 1 μm. When less than about 40% of the entire volume of the organic fiber layer is accounted for by the inorganic component with an average particle size within the range described above, the desired effects can be obtained. Moreover, no original effects of the organic fiber layer are impaired.

When the inorganic component 26 is included, the strength of the insulator 22 including the organic fiber layer 23 can be increased. For example, when a wound type is formed, the bending property becomes better, and when a stacked type is formed, damage at edge parts can be reduced during punching. It is possible, thus, to maintain the performance while the rigidity of the insulating film is maintained.

When the inorganic component 26 is included, resistance to thermal shrinkage can also be increased, in addition to the increased strength of the insulator 22 including the organic fiber layer 23. In particular, when $\alpha$-$Al_2O_3$ is used as the material for the inorganic component 26, the heat resistance of the insulator including the organic fiber layer can be further increased.

The insulator 22 including the inorganic component 26 together with the organic fiber layer 23 can be formed, for example, by spraying the inorganic component 26 while the organic fiber layer 23 is formed according to the method as described above. The insulator 22 including the inorganic component 26 can also be formed by scattering the inorganic component 26 on the surface of the electrode before the organic fiber layer 23 is formed, or on the surface of the organic fiber layer 23 on the electrode.

Figure 14:
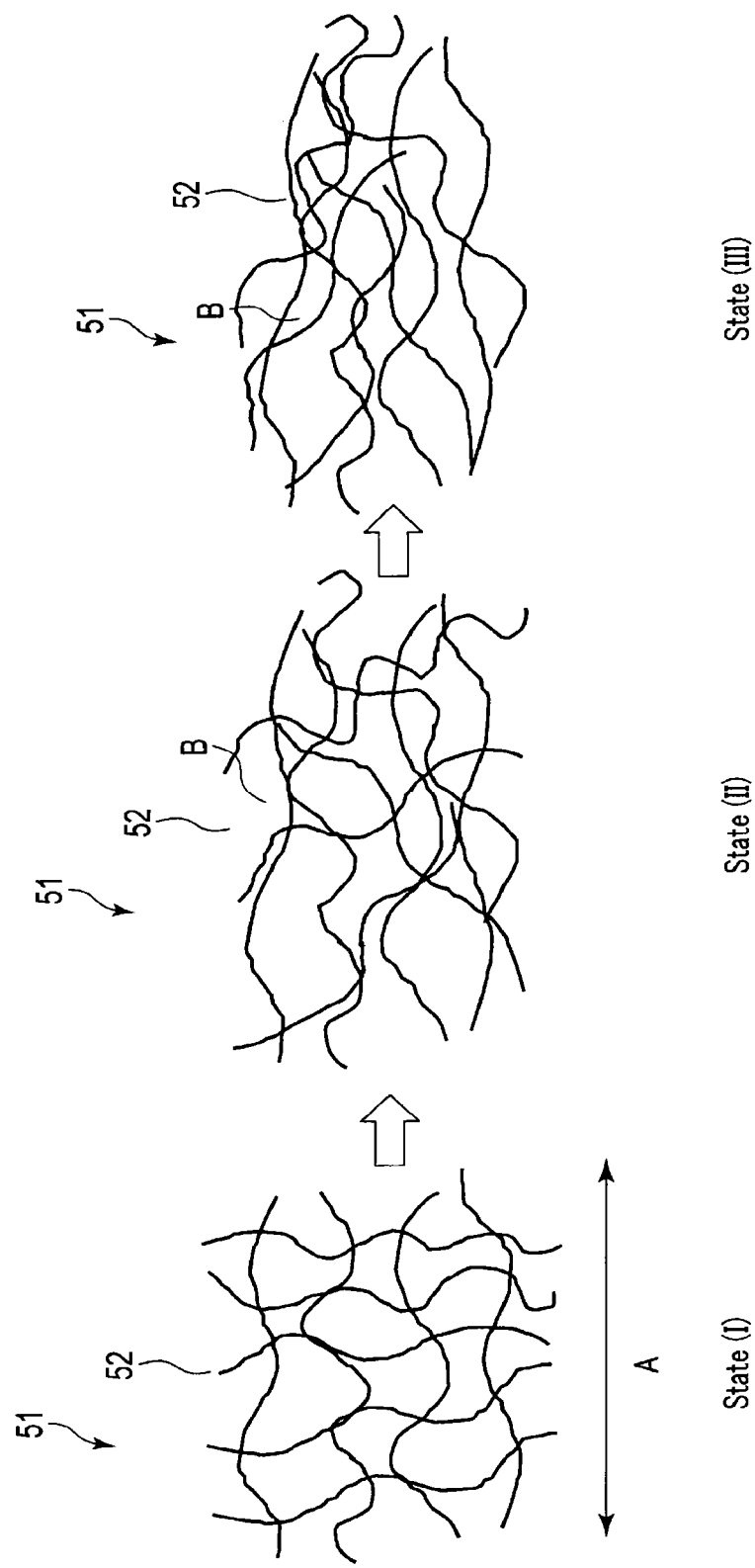
FIG. 14 is a schematic view showing a mechanism occurring when a tensile stress is applied to a separator used in a secondary battery of an embodiment.

The separator including the organic fiber layer in the embodiment has desirably multiple contacts, by which the organic fiber(s) intersect(s) with itself (each other), and open pores or closed pores. As the organic fiber(s) forming the contacts is/are not bonded to itself/each other, the intersection form of the organic fiber is changed by applying a tensile stress to the separator to loosen the contacts. As a result, the organic fibers are aligned in the direction the tensile stress is applied. When the tensile stress is applied to the separator, the inside structure of the separator changes to relieve the stress, and thus the separator in the embodiment has a high breakage strength against tensile stress, and excellent ductility. FIG. 14 shows the mechanism at work when the tensile stress is applied to the separator. States (I), (II) and (III) are arranged in chronological order from the left side in FIG. 14. When a separator 51 is pulled in a direction A as shown in state (I) at the left side in FIG. 14, a contact B of the organic fiber 52 loosens as shown in state (II). Then, almost all of the organic fibers 52 are arranged in a direction A as shown in state (III). The ductility of the separator 51 can be improved, because the stress applied to the separator 51 can be relaxed due to the above series change of the inner structure. As a result, even if the thickness of the separator is reduced, the breakage of the separator can be avoided during handling in the production steps or when vibration is applied to a secondary battery, and thus the thickness of the separator can be reduced. Consequently, an energy density of the battery can be improved, because the volume ratio of the separator in the battery volume can be reduced. In addition, an impedance of the battery can be kept low, because a distance between the positive electrode and the negative electrode can be shortened.

The number of the contacts is desirably within a range of 15 (contacts/100 μm²) or more and 120 (contacts/100 μm²) or less, per unit area of the cross-section of the separator in the thickness direction. This can reduce the self-discharge of the secondary battery when the thickness of the organic fiber layer, which is the separator, is adjusted to a range of 1 μm or more and 21 μm or less. The more preferable range is 30 (contacts/100 μm²) or more and 120 (contacts/100 μm²) or less.

The negative electrode active material preferably includes lithium titanate. When the negative electrode active material including lithium titanate is used, the thickness of the separator can be reduced, and internal short-circuits can be prevented when the porosity is increased. When a spontaneous potential of Li/Li$^+$ is defined as 0 V, a potential of a carbon material is about +0.2 V (vs. Li/Li$^+$). When an overvoltage is applied to a battery, a potential of a negative electrode decreases by about 0.5 V (vs. Li/Li$^+$), and thus the potential of the negative electrode including the carbon material is lower than the spontaneous potential of Li/Li, thus resulting in deposition of Li dendrites on the negative electrode. For this reason, if the thickness of the separator is reduced and the porosity is made high, internal short-circuits, in which Li dendrites pass through the separator and come into contact with the positive electrode, may occur. On the other hand, a negative electrode including lithium titanate has a potential of +1.55 V (vs. Li/Li$^+$), and thus even if an overvoltage is applied, the potential is not lower than the spontaneous potential of Li/Li in principle, and thus internal short-circuits can be avoided even when the thickness of the separator is reduced and the porosity is made high.

For the reasons as explained above, the negative electrode including lithium titanate can avoid the problem of internal short-circuits when a separator including an organic fiber layer, which has 15 (contacts/100 μm²) or more and 120 (contacts/100 μm²) or less, per unit area of the cross-section in the thickness direction, of contacts and has a thickness of 8 μm or more and 21 μm or less, is used. For this reason, the separator having the contacts and thickness described above can inhibit self-discharge of the secondary battery which has the negative electrode including lithium titanate.

According to the embodiment, a secondary battery which includes an electrode including a current collector having an outer edge, a tab protruding from the outer edge of the current collector and integrally formed with the current collector, and an active material-containing layer supported on at least one side of the current collector is provided. The electrode is used as at least one of a positive electrode and a negative electrode. The secondary battery includes the separator including the organic fiber layer. The organic fiber layer is layered on the active material-containing layer and on an intersection part with an end surface of the active material-containing layer on a surface perpendicular to a thickness direction of the tab. The electrode is explained referring to FIG. 15 to FIG. 20.

Figure 15:
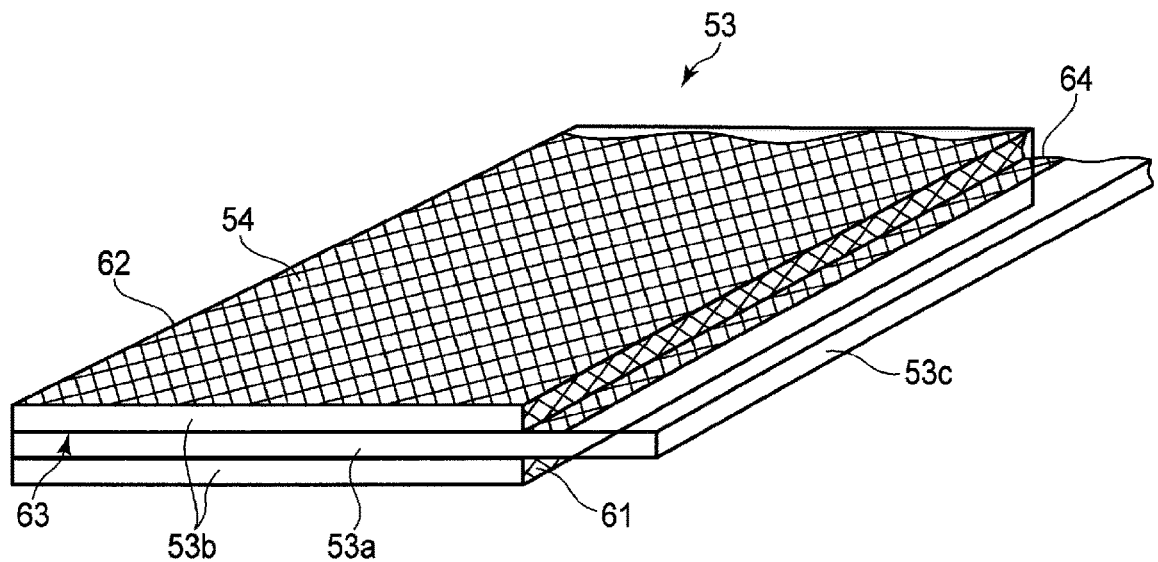
FIG. 15 is a perspective view showing one example of an electrode integrated with an organic fiber layer used in a secondary battery of an embodiment.

As shown in FIG. 15, an electrode 53 includes a strip-shaped current collector 53a, active material-containing layers 53b supported on both sides of the current collector 53a, and a current collector tab 53c protruding from one side of the current collector 53a (in FIG. 15, one long side) and formed of a current collector on which an active material-containing layer is not formed. An organic fiber layer 54 is accumulated on main surfaces of the two active material-containing layers 53b (surfaces perpendicular to a thickness direction of the active material-containing layer 53b), a first end surface 61 at which the current collector tab 53c of the electrode 53 protrudes, a second end surface 62 located opposite to the first end surface 61 of the electrode 53, and an intersection part 64 of the active material-containing layer 53b and the surface perpendicular to the thickness direction of the current collector tab 53c (the main surface). The organic fiber layer 54 is a layer depicted by slanted lines in FIG. 15, and has a seamless structure with no joints.

According to the electrode 53 shown in FIG. 15, the organic fiber layer 54, which is accumulated on the intersection part 64 with the first end surface 61 on the main surface of the current collector tab 53c, closely adheres to the current collector tab 53c, and thus peeling-off of the separator from the electrode can be inhibited and occurrence of internal short-circuits can be reduced between the electrode and the counter electrode. In particular, according to the electrode 53 shown in FIG. 15, the organic fiber layer 54 is accumulated on the main surfaces of the two active material-containing layers 53b, the first end surface 61 of the electrode 53, the second end surface 62 of the electrode 53, and the intersection part 64 with the active material-containing layer 53b on the main surface of the current collector tab 53c in the state with no joints (a seamless structure), and thus even if a vibration is applied to a secondary battery when the secondary battery is mounted on a vehicle such as a car, or charge and discharge is repeated, the peeling-off of the separator from the electrode can be inhibited, and the occurrence of internal short-circuits can be reduced between the electrode and the counter electrode.

Figure 16:
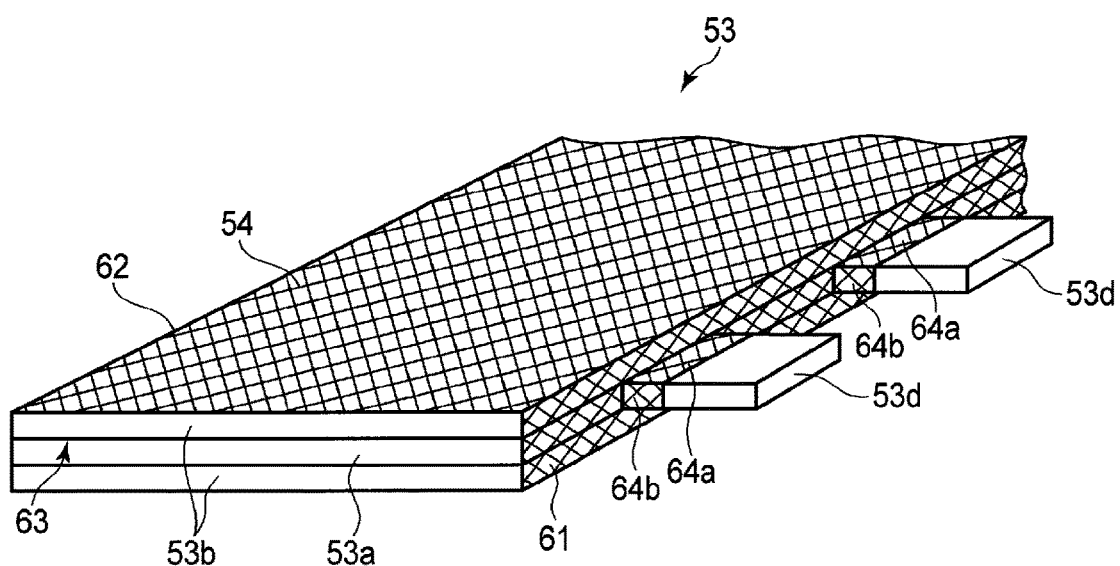
FIG. 16 is a perspective view showing one example of an electrode integrated with an organic fiber layer used in a secondary battery of an embodiment.

An electrode 53 shown in FIG. 16 is an example different in the shape of the current collector tab from the electrode shown in FIG. 15. The electrode 53 includes a strip-shaped current collector 53a, active material-containing layers 53b supported on both sides of the current collector 53a, multiple current collector tabs 53d protruding from one side of the current collector 53a (in FIG. 16, one long side) at intervals and formed of a current collector on which an active material-containing layer is not formed. An organic fiber layer 54 is accumulated on main surfaces of the two active material-containing layers 53b, a first end surface 61 at which the current collector tab 53d of the electrode 53 protrudes, a second end surface 62 located opposite to the first end surface 61 of the electrode 53, an intersection part 64a with the active material-containing layer 53b on the main surface of each current collector tab 53d, and an intersection part 64b with an end surface of the current collector 53a on a side surface of each current collector tab 53d. The organic fiber layer 54 is a layer depicted by slanted lines in FIG. 16, and has a seamless structure with no joints.

According to the electrode 53 shown in FIG. 16, the organic fiber layer 54, accumulated on the intersection part 64a with the active material-containing layer 53b on the main surface of the current collector tab 53d, closely adheres to the current collector tab 53d, and thus peeling-off of the separator from the electrode can be inhibited and occurrence of internal short-circuits can be reduced between the electrode and the counter electrode. In particular, according to the electrode 53 shown in FIG. 16, the organic fiber layer 54 is accumulated on the main surfaces of the two active material-containing layers 53b, the first end surface 61 of the electrode 53, the second end surface 62 of the electrode 53, the intersection part 64a with the active material-containing layer 53b on the main surface on each current collector tab 53d, and the intersection part 64b with the end surface of the current collector 53a on the side surface of each current collector tab 53d in the state with no joints (the seamless structure), and thus even if a vibration is applied to a secondary battery when the secondary battery is mounted on a vehicle such as a car, or charge and discharge is repeated, the peeling-off of the separator from the electrode can be inhibited, and the occurrence of internal short-circuits can be reduced between the electrode and the counter electrode.

In the electrode 53 shown in FIG. 15 or FIG. 16, the organic fiber layer 54 is not be accumulated on a third end surface 63 intersecting with the first end surface, which is the end surface parallel to the short side, and a fourth end surface located opposite to the third end surface 63, but the organic fiber layer 54 may be accumulated on at least one of the third end surface 63 and the fourth end surface.

The electrode 53 shown in FIG. 15 or FIG. 16 may be used for the positive electrode, the negative electrode, or both of the positive electrode and the negative electrode. When the electrode 53 is used for either the positive electrode or the negative electrode, the negative electrode 18 in FIG. 4A, the negative electrode 18 or the positive electrode 20 in FIG. 4B, or the positive electrode 20 in FIG. 4B can be used as a counter electrode.

Figure 17:
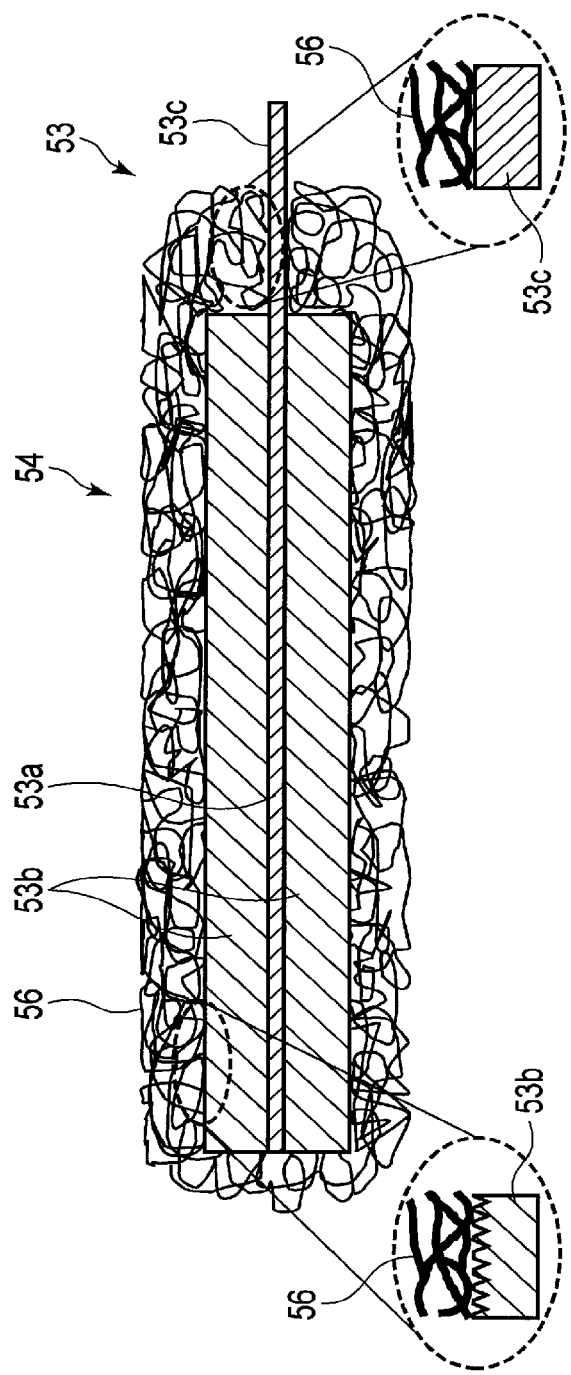
FIG. 17 is a schematic view showing a relationship between a surface roughness and a contact condition of organic fibers in the electrode integrated with the organic fiber layer shown in FIG. 15 or FIG. 16.

When the electrode 53 is used as the negative electrode, it is desirable to form the current collector 53a and the current collector tabs 53c and 53d from at least one conductive material selected from the group consisting of aluminum, aluminum alloy, and copper. This can make the surface roughness of the current collector tab smaller than that of the active material-containing layer, and thus the effect of preventing the peeling-off of the separator from the electrode can be further increased. As shown in FIG. 17, when the surface roughness of the current collector tab 53c is smaller than that of the active material-containing layer 53b, a contact area between the organic fiber 56 and the current collector tab 53c is wider than that between the organic fiber 56 and the active material-containing layer 53b, and thus the adherence strength between the organic fiber layer 54 and the electrode 53 is increased. Here, for the surface roughness, values measured according to any of arithmetic average roughness (Ra), maximum peak height (Rp), and maximum peak roughness (Rz) can be used.

When the electrode 53 is used as the negative electrode, the negative electrode active material includes preferably lithium titanate. A negative electrode active material including lithium titanate expands and shrinks less, due to the charge-discharge reaction, than a tin oxide described in Jpn. Pat. Appln. KOKAI Publication No. 2002-249966, and thus collapse of a crystal structure of the active material can be prevented. Accordingly, when the organic fiber layer 54 is accumulated on the intersection part 64 with the active material-containing layer 53b on the main surface of the current collector tab 53d, and the negative electrode active material including the lithium titanate is used, the peeling-off of the separator from the negative electrode, occurring when a vibration is applied to a secondary battery, and charge and discharge is repeated, can be prevented. The lithium titanate particles have desirably an average primary particle size within a range of 0.001 to 1 μm. When using such particles, a negative electrode active material-containing layer having excellent surface flatness can be obtained, and thus the adherence between the organic fiber layer 54 and the negative electrode substance-containing layer can be improved, and the effect of preventing the peeling-off of the separator from the negative electrode can be increased. When the current collector 53a and the current collector tabs 53c and 53d are formed from at least one conductive material selected from the group consisting of aluminum, aluminum alloy, and copper, the adherence between the organic fiber layer 54 and the current collector tab 53c or 53d can be improved.

As shown in FIG. 18, the electrode 53 (first electrode) can be provided to face a counter electrode (second electrode) 57 covered with no separator. The counter electrode 57 includes a strip-shaped current collector 57a, active material-containing layers 57b supported on both sides of the current collector 57a, and a current collector tab 57c protruding from one side of the current collector 57a and formed of a current collector on which an active material-containing layer is not formed. An organic fiber layer 54, accumulated on an intersection part 64 with an active material-containing layer 53b on a main surface of a current collector tab 53c, faces the active material-containing layer 57b of the counter electrode 57. The main surface is a surface perpendicular to a thickness direction T of a current collector tab 53c. An area S of the organic fiber layer 54 is desirably wider than that of a facing area of the counter electrode 57. This can prevent occurrence of internal short-circuits between the electrode 53 and the counter electrode 57 with certainty.

In the electrode 53, a peel strength of the organic fiber layer 54 from the electrode 53 is desirably 4 N or more, more preferably 6 N or more. This can further increase the effect of preventing the peeling-off of the separator from the electrode 53. The peel strength can be measured using a measuring apparatus, model No. RT-2020D-D-CW, manufactured by Rheotech Co., Ltd., or an apparatus having functions similar thereto.

The electrode 53 having the peel strength within the range described above can be manufactured, for example, by an electrospinning method. In the electrospinning method, a starting material solution is charged by a voltage applied to a spinning nozzle, and an electric charge amount per unit volume of the starting material solution is increased by volatilization of a solvent from the starting material solution. The volatilization of the solvent and the increase of the electric charge amount per unit volume occur continuously, which elongates the starting material solution, discharged from the spinning nozzle, in a longitudinal direction, and a nanosized organic fiber is accumulated on the electrode. A Coulomb force is generated between the organic fiber and the electrode due to a potential between the nozzle and the electrode. The nanosized organic fiber can increase a contact area with the electrode, and the organic fiber can be accumulated on the electrode by the Coulomb force. The peel strength of the separator from the electrode, accordingly, can be increased. The peel strength can be controlled, for example, by controlling a solution concentration or a distance between a sample and nozzle.

As shown in FIG. 19, a third end surface 58 intersecting with the first end surface in the electrode 53 may be covered with an insulating member such as an insulating tape 59. The insulating tape 59 may be pasted to not only the third end surface 58 but also a fourth end surface located opposite to the third end surface 58. The third end surface 58 and the fourth end surface correspond to a winding start end and a winding finish end of the electrode in a wound electrode group. When the third end surface 58 or the fourth end surface is covered with the insulating tape 59, end surfaces, which are not covered with the organic fiber layer 54, can be covered with the insulating tape 59, and thus the occurrence of internal short-circuits with the counter electrode can be prevented with certainty. As the insulating tape 59, for example, a polyimide tape or a Kapton tape can be used. FIG. 20 is a perspective view showing the third end surface 58 before covering with the insulating tape 59.

In the electrode 53, it is desirable that the organic fiber layer 54 has contacts in which the organic fiber(s) intersect(s) with itself (each other) and the form of the intersection is changed by a tensile stress. This can further increase the effect of preventing the peeling-off, because the organic fiber layer 54 can easily deform following a stress applied to the electrode when a vibration is added to the secondary battery or a stress, caused by expansion and shrinking due to charge and discharge, is applied to the electrode.

The physical properties (porosity, number of contacts, and the like) of the separator in the secondary battery can be obtained by measuring the separator which has been out of the secondary battery in the following method. After the secondary battery is completely discharged, i.e., the can or laminate film container is opened in an inert atmosphere such as Ar gas, an electrode structure (electrode group) is taken out. After the separator is removed from the positive electrode and the negative electrode, the separator is washed with a solvent such as diethyl carbonate (DEC) or methylethyl carbonate (MEC) to remove any non-aqueous electrolytic solution from the separator. Then the separator is dried and subjected to measurement.

The thickness of the separator can be measured after the electrode structure (electrode group), which has been taken out from the can or laminate film container of the secondary battery, is subjected to a resin embedding treatment.

The secondary battery according to the present embodiment may be any of a stacked type and a wound type.

Figure 6:
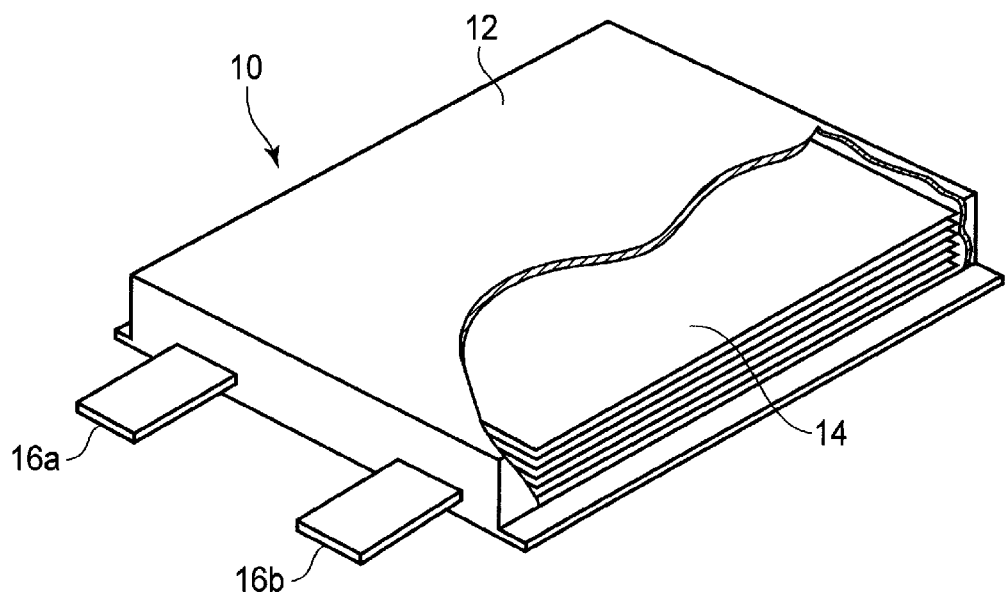
FIG. 6 is a perspective view showing an appearance of a stacked secondary battery.

FIG. 6 is a perspective view showing an appearance of a stacked secondary battery. A secondary battery 10 illustrated has a packaging 12, which is, for example, formed of a laminate film and is in the state of a flat rectangular box, and a non-aqueous electrolytic solution as the electrolyte and a stacked electrode structure 14 are contained within it. A positive electrode terminal 16a and a negative electrode terminal 16b extend outward from one end surface of the packaging 12. The positive electrode terminal 16a and the negative electrode terminal 16b are respectively connected to a positive electrode and a negative electrode, forming the electrode structure 14.

As the electrolyte, a non-aqueous electrolyte is generally used. The non-aqueous electrolyte may include a liquid non-aqueous electrolyte prepared by dissolving an electrolyte in an organic solvent, a gelatinous non-aqueous electrolyte in which a liquid electrolyte is compounded with a polymer material, and the like. The liquid non-aqueous electrolyte can be prepared by dissolving the electrolyte in an organic solvent at a concentration of 0.5 mol/l or more and 2.5 mol/l or less.

The electrolyte may include, for example, lithium salts such as lithium perchlorate ($LiClO_4$), lithium hexafluorophosphate ($LiPF_6$), lithium tetrafluoroborate ($LiBF_4$), hexafluoro arsenic lithium ($LiAsF_6$), trifluoromethanesulfonic acid lithium salt ($LiCF_3SO_3$), lithium bistrifluoromethylsulfonylimide[$LiN(CF_3SO_2)_2$], or mixtures thereof. The compounds which are not easily oxidized even at a high potential are preferable, and $LiPF_6$ is most preferable. The organic solvent may include, for example, cyclic carbonates such as propylene carbonate (PC), ethylene carbonate (EC) or vinylene carbonate; linear carbonates such as diethyl carbonate (DEC), dimethyl carbonate (DMC) or methylethyl carbonate (MEC) cyclic ethers such as tetrahydrofuran (THF), 2-methyl tetrahydrofuran (2MeTHF) or dioxolane (DOX); linear ethers such as dimethoxyethane (DME) or diethoxyethane (DEE); γ-butyrolactone (GBL), acetonitrile (AN), sulfolane (SL), and the like. The organic solvents may be used alone or as a mixture of two or more kinds.

The polymer material may include, for example, polyvinylidene fluoride (PVdF), polyacrylonitrile (PAN), polyethylene oxide (PEO), and the like.

As the non-aqueous electrolyte, a room temperature molten salt including lithium ions, which is an ionic melt, a solid polymer electrolyte, and an inorganic solid electrolyte may be used.

As shown in FIG. 7, an electrode structure 14 includes multiple electrode cells 24, and in each electrode cell 24, a positive electrode 18 and a negative electrode 20 are electrically isolated from each other through an insulator 22 including an organic fiber layer. The insulator 22 includes the organic fiber layer formed directly on a surface of the negative electrode 20, which can be formed using materials as already explained in a method as already explained. In the example illustrated, the insulator 22 including the organic fiber layer is formed directly on the surface of the negative electrode 20, but the layer may be formed directly on the positive electrode 18. As described above, the thickness of the organic fiber layer can be made thin such as less than 12 µm. This can reduce the thickness of the insulator 22 and the number of the electrode cells 24 stacked can be increased, and thus the battery capacity is not reduced.

Each positive electrode 18 has a rectangular positive electrode current collector 18a formed of a foil of aluminum or the like, and positive electrode active material layers 18b supported on both side of the positive electrode current collector 18a. The positive electrode active material layer 18b is formed over the whole surface of the positive electrode current collector 18a. Each positive electrode 18 has a positive electrode tab 18c for collecting electricity, which protrudes almost perpendicularly from an outer edge, for example, a side edge, of the positive electrode current collector 18a. This positive electrode tab 18c is formed integrally with the positive electrode current collector 18a from the same material as that of the positive electrode current collector 18a, and extends from the positive electrode current collector with no gaps or joints.

Each negative electrode 20 has a rectangular negative electrode current collector 20a formed of a foil of aluminum or the like, and negative electrode active material layers 20b supported on both sides of the negative electrode current collector 20a. The negative electrode active material layer 20b is formed over the whole surface of the negative electrode current collector 20a. Each negative electrode 20 has a negative electrode tab 20c for collecting electricity, which protrudes almost perpendicularly from an outer edge, for example, a side edge, of the negative electrode current collector 20a. The negative electrode tab 20c is formed integrally with the negative electrode current collector 20a from the same material as that of the negative electrode current collector 20a, and extends from the negative electrode current collector with no gaps or joints. The negative electrode tab 20c protrudes on the same side of the positive electrode tab 18c, and is provided on the longitudinal side of the negative electrode current collector 20a and faces the positive electrode tab 18c.

Figure 8:
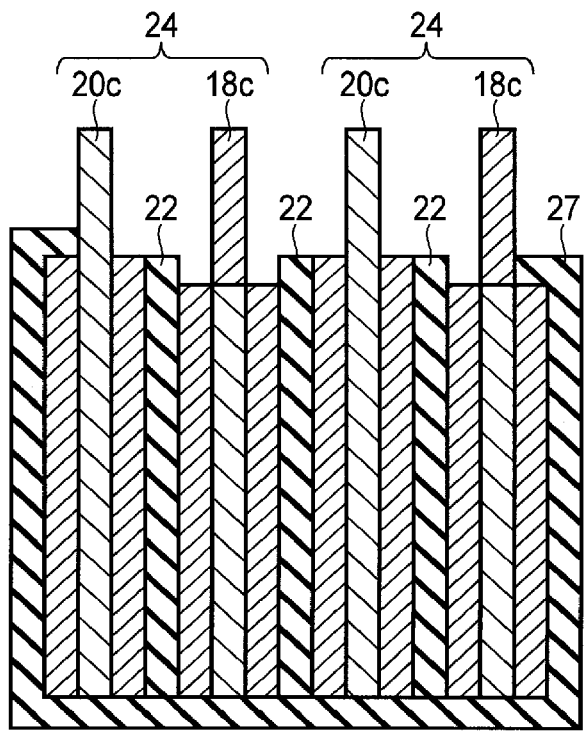
FIG. 8 is a cross-sectional view showing another example of an electrode structure.

As shown in FIG. 8, a periphery of the electrode structure may be covered with the insulator 27 including the organic fiber layer except for the positive electrode tab 18c and the negative electrode tab 20c. The organic fiber layer 27 covering the periphery can be formed from the same material as used for the insulator 22, which separates the positive electrode 18 from the negative electrode 20, in the same manner. It is also possible to form the insulator 27 including the organic fiber layer on a surface of an electrode structure, because the starting material is supplied on the surface of the substrate such as the electrode and the insulator is directly formed on the substrate.

The stacked electrode structure is usually produced through a punching step. When the punching is performed, chips are generated on the metal foil forming the current collector, and they cause short-circuits. As shown in FIG. 8, when the periphery, except for the positive electrode tab 18c and the negative electrode tab 20c, is covered with the insulator 27 including the organic fiber layer, short-circuits can be avoided and the safety of the battery can be increased.

Figure 9:
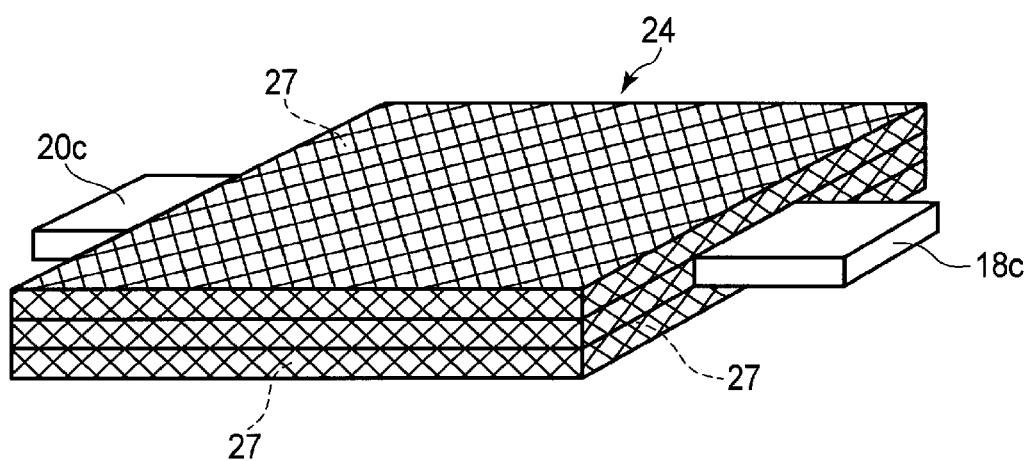
FIG. 9 is a perspective view showing another example of a battery cell.

As shown in the perspective view of FIG. 9, the insulator 27 including the organic fiber layer can cover the whole surface of the electrode cell 24 except for the positive electrode tab 18c and the negative electrode tab 20c. The safety of the electrode cell can be easily increased by covering the surface of the electrode cell 24 with the insulator as described above. Moreover, such a structure can provide not only an expanded permissible range of a deviation between the electrode surfaces facing each other but also a rarely occurring influence of the chips of the electrode and the current collector, and thus a probability of occurrence of short-circuits can be reduced. In addition, there is an advantage in which short-circuits can be avoided at the electrode edge.

FIG. 10 is an exploded perspective view showing a wound secondary battery. The wound electrodes 30 illustrated has a flat wound body 36 and multiple current collector tabs 37a and 37b, and two pairs of the current collectors 38 and 39. The wound body 36 includes a strip-shaped negative electrode 34, a separator 33a, a strip-shaped positive electrode 35, and a separator 33b. The separator 33a includes an organic fiber layer directly formed on a surface of the negative electrode 34. The separator 33b can be a strip-shaped member, but may be the organic fiber layer directly formed on the surface of the positive electrode 35. It can be said that the wound body 36 is a structure in which a laminate of the negative electrode 34, the separator 33a, the positive electrode 35, and the separator 33b, which are disposed in this order, is wound.

The organic fiber layer included in the separator 33a can be formed on the surface of the negative electrode 34 using the materials already explained in accordance with the method already explained. As described above, the organic fiber layer can have a thickness of less than 12 μm. This can reduce the thickness of the separator 33a and the number of the windings of the laminate can be increased, and thus the battery capacity is not reduced.

The thus resulting wound electrodes 30 are liquid-tightly housed in a battery container 41, and impregnated with the non-aqueous electrolyte. The inside surface of the battery container 31 is covered with an insulating layer (not shown in the drawing), by which the wound electrodes 30 are electrically isolated from battery container 41. The wound electrodes 30 are disposed in the container 41 so that the current collectors 38 and 39, which are collector members, are located to face the main surface side of the battery container 41. The negative electrode current collector 38 is connected to the negative electrode terminal 44a through a lead member (not shown in the drawing). Similarly, the positive electrode current collector 39 is connected to the positive electrode terminal 44b through a lead member (not shown in the drawing).

The negative electrode terminal 44a and the positive electrode terminal 44b are each attached to a lid 43 through an insulating hermetic seal member (not shown in the drawing). The periphery of the lid 43 is welded to a periphery wall of a container opening 41a.

Figure 11:
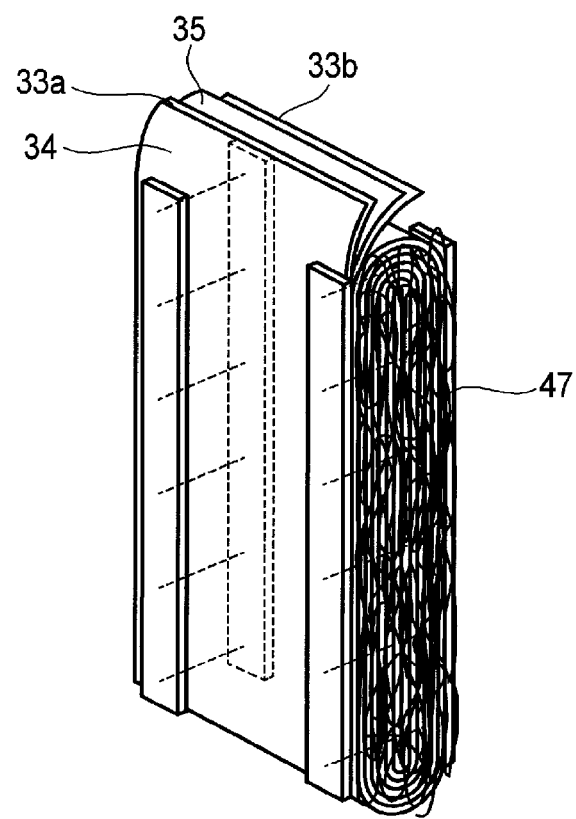
FIG. 11 is a perspective view showing another example of a wound type battery.

As shown in FIG. 11, in the wound body 36, end surfaces of the negative electrode 34 and the positive electrode 35 may be covered with the insulator 47 including the organic fiber layer. This organic fiber layer 47 can be formed using the same material of the organic fiber layer as that of the organic fiber layer formed on the surface of the negative electrode 34 as the separator 33a in the same production method as that of the layer. The occurrence of the short-circuit is avoided at the edge because the edge of the wound body is covered with the insulator, and the safety as the battery can be increased.

Concrete examples are shown below.

Example 1

A negative electrode in which negative electrode active material layers including lithium titanate were formed on a current collector formed of an aluminum foil was prepared. Primary particles of the lithium titanate had an average particle size of 0.5 μm. An organic fiber layer was formed on the negative electrode according to an electrospinning method.

PVdF was used as the organic material. A starting material solution for forming the organic fiber layer was prepared by dissolving PVdF in DMAc, which is a solvent, at a concentration of 20% by mass. The obtained starting material solution was supplied onto the surface of the negative electrode from a spinning nozzle using a metering pump at a supply speed of 5 μl/minute. A voltage of 20 kV was applied to the spinning nozzle using a high voltage generator, thereby the organic fiber layer was formed by moving one of the spinning nozzles in the range of 100×200 mm.

The results of SEM observation confirmed that the organic fiber layer formed had a thickness of 10 μm or less, and a diameter of the organic fiber of 50 nm or less. In addition, a mercury penetration method confirmed a porosity of 85% or more.

The surface and the contact surface with the electrode of the obtained organic fiber layer were observed by SEM, and a great difference was not observed between the two surface states. From this fact, it was confirmed that there were also pores at the contact surface with the electrode in the organic fiber layer.

Next, a simple cell was produced and battery performances were evaluated.

An electrode, in which negative electrode active material layers including lithium titanate were formed on a current collector formed of an aluminum foil, was prepared as a negative electrode, and an electrode, in which positive electrode active material layers including lithium cobalt oxide were formed on a current collector formed of an aluminum foil, was prepared as a positive electrode.

A starting material solution for forming the organic fiber layer was prepared by dissolving PVdF, which was an organic material, in DMAc, which was a solvent, at a concentration of 20% by mass.

Using the obtained starting material solution, the organic fiber layer was formed on the surface of the negative electrode under the same conditions as described above. Two kinds of organic fiber layer were produced by changing a film-forming time in the electrospinning. Specifically, the film forming time in the electrospinning was set at 30 minutes or 60 minutes.

The results of SEM observation confirmed that any of the organic fiber layer formed had a thickness of 10 μm or less, and 40% of the entire volume of the fibers forming the fiber layer was accounted for by the fibers having a diameter of about 50 nm. From the length measurement and the observation of the fiber film by SEM, it can be presumed that the organic fiber has a length of at least 1 mm. The positive electrode was disposed on the obtained organic fiber layer, which was punched into a predetermined size to give an electrode structure. After the structure was subjected to vacuum drying at room temperature overnight, it was allowed to stand in a glove box having a dew point of −80° C. or lower for one day.

The resulting structure was housed in a battery container together with an electrolytic solution to give a sample 1 or sample 2 of the present embodiment. The electrolytic solution used was obtained by dissolving $LiPF_6$ in ethylene carbonate (EC) and dimethyl carbonate (DMC).

A cell of Comparative Example 1 was produced in the same formation as above except that a polyethylene separator conventionally used was used. The polyethylene separator used here had a thickness of about 20 μm.

Initial charging characteristics of the sample cells and the cell of Comparative Example 1 were measured. The results are shown in FIG. 12. The initial charging characteristics were obtained from a measurement using a potentiostat at a charging rate of 1 C. In FIG. 12, curves a, b and c are results of the sample cell (30 minutes), the sample cell (60 minutes), and the comparative cell, respectively.

As shown by curve c, in the cell of Comparative Example 1 using the polyethylene separator, the capacity reduces as the rate is increased, and it reduces to about 3.1 mAh at a rate of 8 C. On the other hand, in the sample cells of the embodiment having the electrospun film (the curves a and b), the reduction of the capacity is smaller than that in the cell of Comparative Example 1.

The separator using the sample cell (30 minutes) (hereinafter referred to as the separator of Example 1a) had a porosity of 93%, and a number of contacts, per unit area in the cross section in the thickness direction, of 46 (contacts/100 μm$^2$). On the other hand, the separator using the sample cell (60 minutes) (hereinafter referred to as the separator of Example 1b) had a porosity of 86%, and a number of contacts, per unit area in the cross section in the thickness direction, of 89 (contacts/100 μm$^2$).

Figure 21:
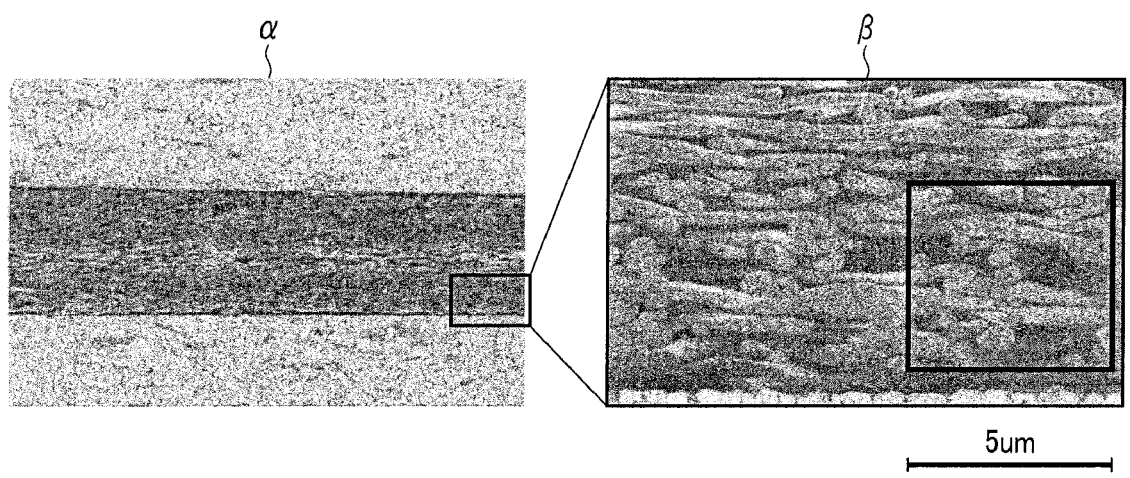
FIGS. 21α and 21β are scanning electron microscope (SEM) photographs showing a cross-section obtained when a separator from the Example is cut along the thickness direction thereof.

The method of measuring the number of contacts is as follows: A scanning electron microscope (SEM) photograph of a cross section, obtained when the separator is cut in the thickness direction thereof, is photographed. An SEM photograph of the separator of Example 1b is shown in FIG. 21α. At arbitrary 22 points in the SEM photograph, the number of contacts in a 5 μm square is counted, and from the obtained results, the number of contacts per 100 μm$^2$ is calculated. FIG. 21 is an enlarged photograph of a 5 μm square area of the SEM photograph shown in FIG. 21α.

It can be confirmed by the SEM observation after the separator is pulled that the contact, the intersection form of the organic fibers, is changed by a tensile stress.

In the present embodiment, the electrospun film is used as the separator, and this film has a thin thickness and a high porosity. For this reason, the movement efficiency of ions is improved, an electrolytic solution-lack layer is not generated and it is possible to suppress from increasing the impedance in the separator. As a result, it can be presumed that the initial charge efficiency is increased.

Rate characteristics were confirmed by evaluating to what extent the charge and discharge can be performed by altering a charge and discharge speed, and improvement in the rate characteristics were also confirmed. The thin film thickness of the separator and the high porosity relate to not only the increased initial charge capacity but also the improved rate characteristics.

Self-discharge characteristics of the sample cells and the cells of Comparative Example 1 were measured. The results are shown in FIG. 13. The self-discharge characteristics were obtained from a measurement using a potentiostat.

As shown in FIG. 13, in the cells of Comparative Example 1 using a cellulose separator, the voltage reduced to 0.7 V after 48 hours, due to self-discharge.

On the other hand, in the sample cells of the embodiment using the electrospun film, it is understood that self-discharge is inhibited. In particular, in the sample cell 2 having the electrospun film (60 minutes), the voltage is maintained at 2 V or more even after 75 hours.

In the present embodiment, because the electrospun film is formed, misalignment between the electrode surfaces facing each other and exposure of the edge are substantially prevented. It can be presumed that improvements in the self-discharge characteristics are realised by such factors.

The organic fiber layer fixed and supported on the electrode is used as the separator in the present embodiment, and thus the secondary battery having excellent initial charge capacity and self-discharge characteristics can be obtained.

Example 2

A ductility of the separator of Example 1b was measured. The results are shown in FIG. 22. In addition, a separator formed of a cellulose fiber non-woven fabric, having a thickness of 30 μm and a porosity of 80%, was prepared as a separator of Comparative Example 2. The separator of Comparative Example 2 was a commercially available product, and is generally used in a capacitor, or the like. The ductility of the separator of Comparative Example 2 was measured under the same conditions as in Example 1b. The results are also shown in FIG. 22.

As apparent from FIG. 22, breakage of the separator of Example 1b occurred at a tensile stress of more than 2 MPa; and breakage of the separator of Comparative Example 2 occurred at a tensile stress of less than 1 MPa. From these results, it can be understood that the separator of Example 1b has a ductility about 12 times that of the separator of Comparative Example 2.

The surfaces of the separators of Example 1b and Comparative Example 2 were observed by SEM. An SEM photograph of the surface of the separator of Example 1b is shown in FIG. 23, and SEM photographs of the surface of the separator of Comparative Example 2 are shown in FIGS. 24 to 26.

Figure 23:
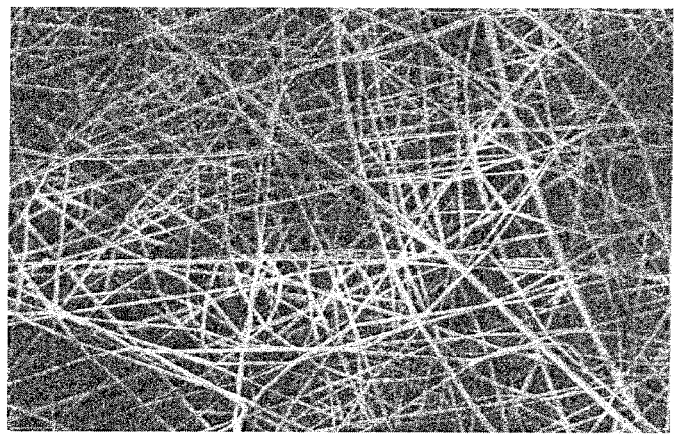
FIG. 23 is an SEM photograph of a surface of the separator from Example 1b.
Figure 24:
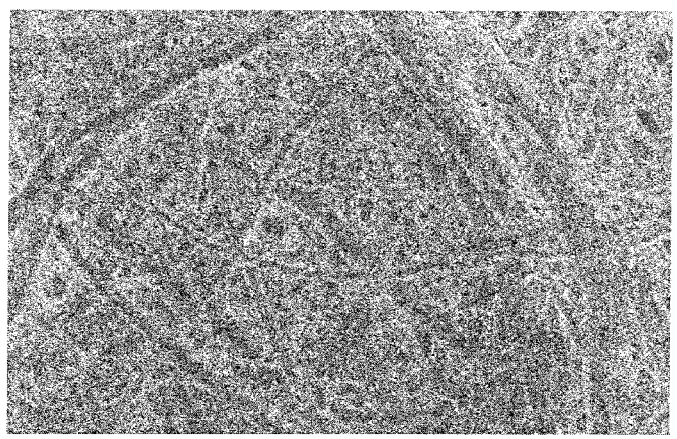
FIG. 24 is an SEM photograph of a surface of the separator from Comparative Example 2.

As apparent from the SEM photograph of FIG. 23, the contact of the organic fiber forming the separator of Example 1b does not involve a chemical bond, such that the organic fibers are brought into contact with each other, the organic fibers are overlapped with each other, or the organic fibers are interwound with each other, and is formed by a physical or mechanical bond occurring between the organic fibers. When a tensile stress is applied to the separator of Example 1b, accordingly, the contact of the organic fiber is loosened and the direction of the organic fibers is equal to the direction of the tensile stress, thus breakage hardly occurs and the separator of Example 1b has excellent ductility. On the other hand, as apparent from the SEM photographs of FIGS. 24 to 26, regarding the separator of Comparative Example 2 formed of cellulose fiber non-woven fabric, the contact is formed by a chemical bond between the cellulose fibers, and the cellulose fibers are fixed at the contact. For this reason, when tensile stress is applied to the separator of Comparative Example 2, the cellulose fiber is extended from the contact as the base point, thus resulting in breakage. The ductility of the separator of Comparative Example 2 depends on the strength of the cellulose fiber itself, and is inferior to those of the Examples.

The peel strengths of the separators of Example 1b and Comparative Example 2 were measured using a measuring apparatus, model No. RT-2020D-D-CW, manufactured by Rheotech Co., Ltd. The measurement of the separator of Comparative Example 2 was performed after a negative electrode, produced in the method in Example 1, was pressure-joined thereto. The peel strength between the separator of Example 1b and the negative electrode was 24 N, whereas the peel strength between the separator of Comparative Example 2 and the negative electrode was equal to the minimum limit of detection or less.

Example 3

An organic fiber layer was formed on a surface of a negative electrode under the same conditions as explained in Example 1, except that a film-forming time in the electrospinning was changed to those shown in Table 1. The organic fiber layer had a form shown in FIG. 15. Regarding the negative electrode, the values of surface roughness of a current collector tab were an Ra of 0.31 um and Rz of 3.34 um; those of a negative electrode active material-containing were an Ra of 1.23 um and Rz of 15.74 um, thus the surface roughness of the current collector tab was smaller than the surface roughness of the negative electrode active material-containing layer. Table 1 gives the thickness of the organic fiber layer, the length and diameter of the organic fiber, the volume ratio of the entire amount of fibers forming the organic fiber layer, having a diameter of 50 nm or less, the average pore size of the pores, the porosity, and the number of contacts per unit area in the cross section in the thickness direction, obtained in Examples 11 to 20.

[Table 1]

TABLE 1

|  | Film-forming time (minute) | Thickness (μm) | Organic fiber diameter (μm) | Ratio of organic fibers having a diameter of 350 nm or less (%) | Average pore size (μm) | Porosity (%) | Number of contacts (contacts/100 μm$^2$) |
|---|---|---|---|---|---|---|---|
| Example 11 | 5 | 5 | 300 | 84 | 0.64 | 93 | 20 |
| Example 12 | 9 | 5 | 300 | 82 | 0.35 | 85 | 35 |
| Example 13 | 20 | 5 | 300 | 81 | 0.15 | 76 | 80 |
| Example 14 | 30 | 5 | 300 | 80 | 0.10 | 70 | 119 |
| Example 15 | 6 | 6 | 300 | 84 | 0.53 | 93 | 20 |
| Example 16 | 8 | 8 | 300 | 84 | 0.4 | 93 | 20 |
| Example 17 | 13.5 | 13.5 | 300 | 84 | 0.24 | 93 | 20 |
| Example 16 | 14 | 14 | 300 | 84 | 0.23 | 93 | 20 |
| Example 19 | 17 | 17 | 300 | 84 | 0.18 | 93 | 20 |
| Example 20 | 21 | 21 | 300 | 84 | 0.15 | 93 | 20 |

Using the negative electrode integrally formed with the organic fiber layer obtained in each of Example 11 to 20, samples 11 to 20 were produced in the same manner as in Example 1.

With respect to sample cells 11 to 20, a self-discharge amount (mAh/day) was measured using a potentiostat. Measurement conditions were as follows: SOC (state-of-charge) before storage of 100%, storage temperature of 25° C., and storage term of 7 days.

Figure 27:
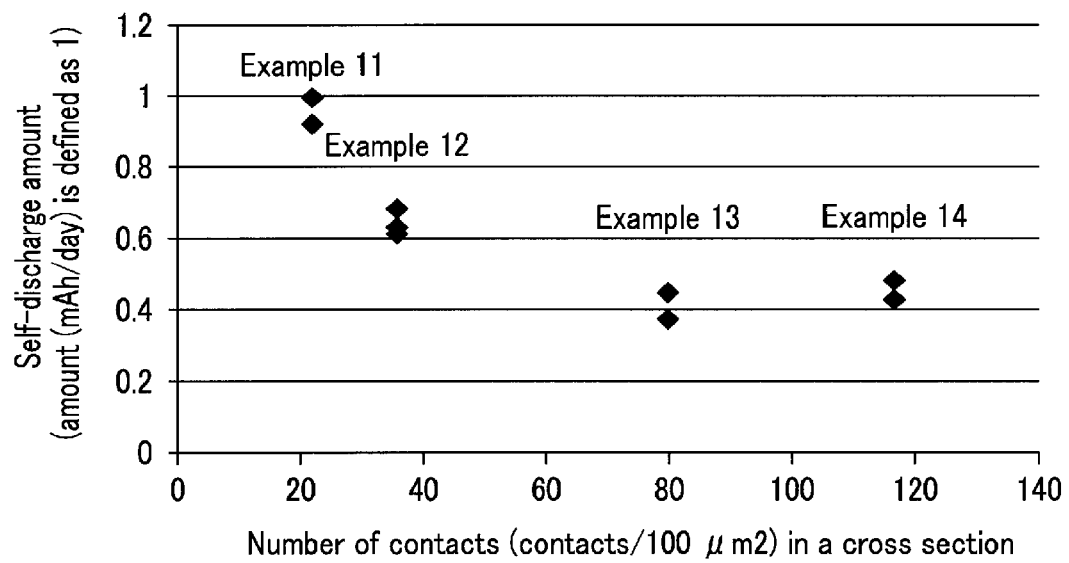
FIG. 27 is a chart showing a relationship between the number of contacts and a self-discharge amount in samples of Example 11 to Example 14.
Figure 28:
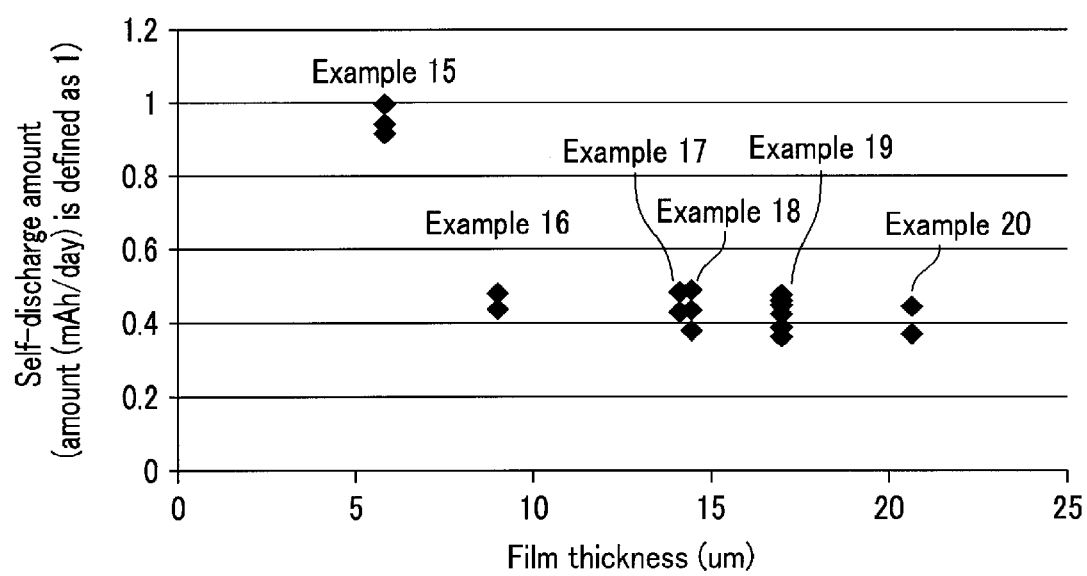
FIG. 28 is a chart showing a relationship between the number of contacts and a self-discharge amount in samples of Example 15 to Example 20.

The results of sample cells 11 to 14 and the results of sample cells 15 to 20 are shown in FIG. 27 and FIG. 28, respectively. In FIG. 27, the maximum value of the self-discharge amount (mAh/day) of the sample cell 11 is defined as 1, and other self-discharge amounts are shown. In FIG. 28, the maximum value of the self-discharge amount (mAh/day) of the sample cell 15 is defined as 1, and other self-discharge amounts are shown.

As apparent from FIG. 27, when the thickness is fixed, the sample cells of Examples 12 to 14, having a number of contacts of 30 (contacts/100 μm$^2$) or more and 120 (contacts/100 μm$^2$) or less, had a self-discharge amount smaller than that of the sample cell of Example 11, which had a number of contacts of less than 30 (contacts/100 μm$^2$) In addition, as apparent from FIG. 28, when the porosity and the number of contacts are fixed, the sample cells of Example 16 to 20, which had a thickness of 8 to 21 μm, had a self-discharge amount smaller than that of the sample cell of Example 15, which had a thickness of less than 8 rm.

The contact can be formed by, for example, an electrospinning method. The SEM photographs of the surfaces of the separators of Reference Example 1 to 3 and Example 3, shown in FIG. 29 to FIG. 32, are those obtained by photographing separators formed by shortening the electrospinning time to several seconds, in order to easily find the disposition of the fibers. The separator of Reference Example 1, shown in FIG. 29, has a three-dimensional steric structure in which multiple microfibers are bonded to resin particles. The separator of Reference Example 2, shown in FIG. 30, has dispersion in the diameter of the organic fiber. In the separator, shown in FIG. 31, there are both thick organic fibers and thin organic fibers. In the separators of Reference Examples 1 to 3, the particulate or thick parts are fixed, and thus it is difficult to change the form of the contact at which the organic fibers intersect with each other when a tensile stress is applied to the separator. On the other hand, as exemplified by FIG. 32, when the diameter of the organic fiber is small and uniform, the form of the contact at which the organic fibers intersect with each other is changed by applying tensile stress to the separator. The layer of the organic fiber whose diameter is small and uniform can be obtained by controlling a solution concentration, a distance between the sample and the nozzle, and the like in the electrospinning method.

Figure 33:
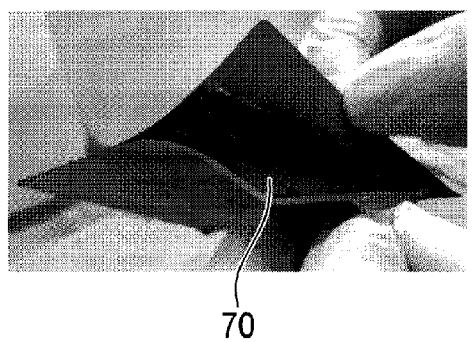
FIG. 33 is a photograph illustrating a test for confirming a state of a covered separator in a negative electrode from Example 3.

After the samples of Example 11 to 20 in Example 3 were subjected to charge and discharge, the sample was disassembled, and the state of the covered separator was observed. As shown in FIG. 33, the separator was removed from the positive electrode, and whether or not the separator was existed on the negative electrode was visually observed.

It was confirmed that, of all the samples, the negative electrode was covered with the separator even after the charge and discharge.

Example 4

An electrode shown in FIG. 15, in which a negative electrode active material layer including lithium titanate was formed on a current collector formed of an aluminum foil as a negative electrode, was prepared in the same manner as in Example 1. An organic fiber layer was formed on the negative electrode according to an electrospinning method. The organic fiber layer had a form shown in FIG. 15. Regarding the negative electrode, the values of surface roughness of a current collector tab were an Ra of 0.31 um and Rz of 3.34 um; those of a negative electrode active material-containing layer were an Ra of 1.23 um and Rz of 15.74 um; thus the surface roughness of the current collector tab was smaller than the surface roughness of the negative electrode active material-containing layer.

Polyamide was used as the organic material. A starting material solution for forming the organic fiber layer was prepared by dissolving polyamide in DMAc, which is a solvent, at a concentration of 15% by mass. The obtained starting material solution was supplied onto the surface of the negative electrode from a spinning nozzle using a metering pump at a supply speed of 100 μl/minute. A voltage of 30 kV was applied to the spinning nozzle using a high voltage generator, thereby the organic fiber layer was formed by moving a spinning nozzle in the range of 100×200 mm.

The results of observation by SEM show that the organic fiber layer formed had a thickness of 10 μm, and 80% of the entire volume of the fibers forming the fiber layer was accounted for by organic fibers having a diameter of 350 nm or less. It was also confirmed, by the mercury penetration method, that the porosity was 85% and the average pore size of the pores was 0.4 μm. In addition, it was confirmed that the number of contacts, per unit area in the cross section in the thickness direction, was 80 (contacts/100 μm$^2$) in the same manner as in Example 1.

Using the negative electrode on which the organic fiber layer was accumulated, a sample was produced in the same manner as in Example 1. As a sample of Comparative Example 3, a cell having the same formation as that in Example 1, except that the separator of Comparative Example 2 was used, was prepared.

Figure 34:
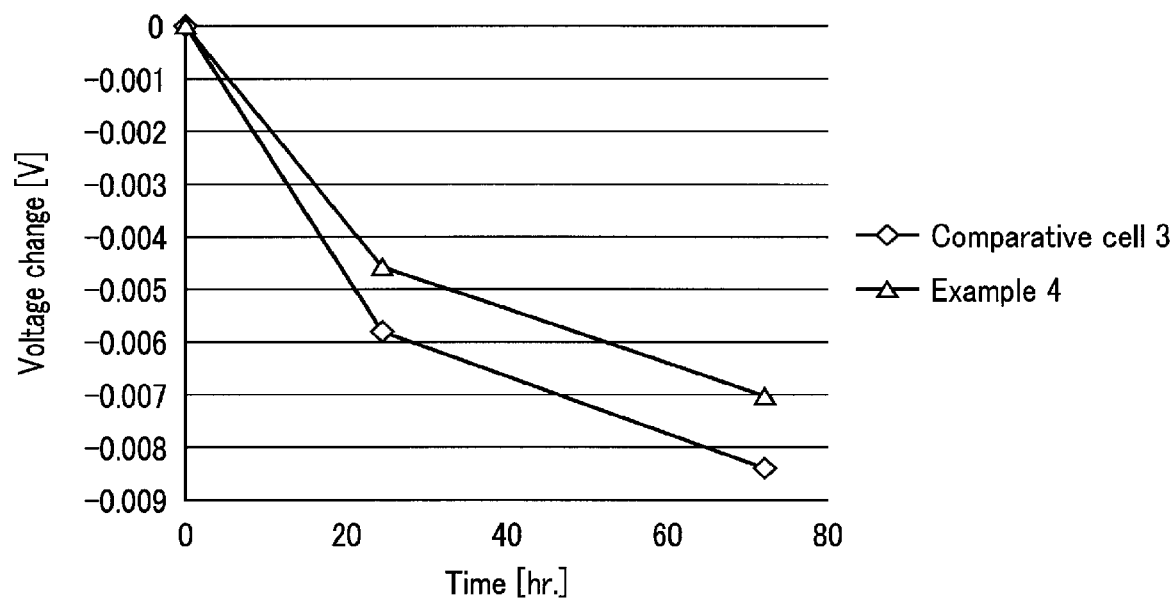
FIG. 34 is a chart showing a relationship between a storage time and a voltage change in a secondary battery from Example 4 or Comparative Example 3.
Figure 35:
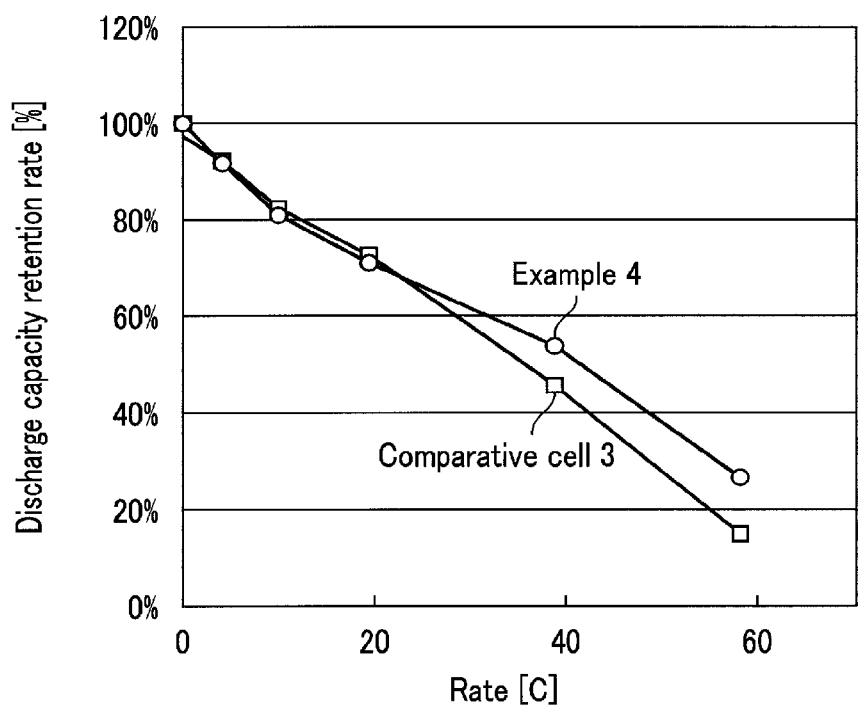
FIG. 35 is a chart showing a relationship between a discharge rate and a discharge capacity retention rate in the secondary battery from Example 4 or Comparative Example 3.

With respect to the sample cell of Example 4 and the cell of Comparative Example 3, the self-discharge characteristics, measured under the same conditions as in Example 3, are shown in FIG. 34, and the rate characteristics, measured in the same method as in Example 1, are shown in FIG. 35. The rate characteristic are expressed by a discharge capacity at 5 C, 10 C, 20 C, 40 C, or 60 C, the discharge capacity at 1 C being defined as 100%.

As apparent from FIG. 34, the sample cell of Example 4 is smaller in the voltage change relative to the storage time than in Comparative Example 3, and thus the self-discharge characteristic thereof is excellent. As apparent from FIG. 35, the sample cell of Example 4 is also larger in the discharge capacity retention rate when the discharge rate is increased than the cell of Comparative Example 3, and thus the rate characteristic is excellent. After the sample cell of Example 4 was subjected to charge and discharge, the sample was disassembled, and the separator was removed from the positive electrode. Whether or not the separator was present on the negative electrode was visually observed. It was confirmed that the negative electrode was covered with the separator even after the charge and discharge.

According to at least one secondary battery of the embodiments and Examples, the organic fiber layer, layered on the intersection part of the end surface of the active material-containing layer and the surface perpendicular to the thickness direction of the tab, is included, whereby the peeling-off of the separator from the electrode can be inhibited. According to the secondary batteries of the embodiments and Examples, the organic fiber layer having the contacts in which the organic fibers intersect with each other and the form of the intersection is changed by a tensile stress, is included, whereby the ductility of the separator can be improved. As a result, a secondary battery having high energy density and low impedance can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method of manufacturing an electrode with an organic fiber layer, the electrode comprising a current collector having an outer edge, a tab protruding from the outer edge of the current collector, and an active material-containing layer supported on at least one side of the current collector, the method comprising:
    forming the organic fiber layer through an electrospinning method by discharging a starting material solution from a spinning nozzle over at least a part of a main surface of the active material-containing layer and an intersection part between an end surface of the active material-containing layer and a surface of the tab that is perpendicular to a thickness direction of the tab;
    wherein the starting material solution comprises a solvent and an organic material dissolved in the solvent,
    the solvent is at least one selected from the group consisting of dimethylacetoamide, dimethylsulfoxide, N,N-dimethylformamide, N-methylpyrrolidone, and water, and
    the organic material is at least one selected from the group consisting of polyamide-imide, polyamide, polyolefin, polyether, polyimide, polyketone, polysulfone, cellulose, polyvinyl alcohol, and polyvinylidene fluoride,
    wherein the organic fiber layer is porous.

2. The method according to claim 1, wherein the organic material is at least one selected from the group consisting of polyamide-imide, polyamide, polyimide, and polyvinylidene fluoride.

3. The method according to claim 1, wherein the solvent is at least one selected from the group consisting of dimethylacetoamide, N,N-dimethylformamide, and N-methylpyrrolidone.

4. The method according to claim 1, wherein the organic fiber layer is accumulated on the end surface of the active material-containing layer.

5. The method according to claim 1, wherein the active material-containing layer comprises lithium titanate.

6. The method according to claim 5, wherein particles of the lithium titanate have an average primary particles size within a range of 0.001 to 1 μm.

7. The method according to claim 1, wherein the tab is formed of at least one conductive material selected from the group consisting of aluminum, aluminum alloy, and a copper.

8. A method of manufacturing a secondary battery comprising:
   preparing the electrode with the organic fiber layer by the method according to claim 1, and
   providing a counter electrode to face the organic fiber layer.

\* \* \* \* \*